US012650394B2

(12) United States Patent
Cutting et al.

(10) Patent No.: US 12,650,394 B2
(45) Date of Patent: Jun. 9, 2026

(54) SMALL VOLUME SYSTEM AND METHODS OF EVALUATING THE STABILITY OF BIOPHARMACEUTICAL COMPOSITIONS

(71) Applicant: Sartorius Stedim North America Inc., Bohemia, NY (US)

(72) Inventors: Jonathan Cutting, Heber City, UT (US); Thomas Mickleburgh, Cambridge, MA (US); Nicholas Phillips, Buffalo, NY (US); Alexander Kaiser, Lancaster, NY (US); Friedrich Maier, Staufenberg (DE)

(73) Assignee: Sartorius Stedim North America Inc., Bohemia, NY (US)

( * ) Notice: Subject to any disclaimer, the term of this patent is extended or adjusted under 35 U.S.C. 154(b) by 485 days.

(21) Appl. No.: 18/197,911

(22) Filed: May 16, 2023

(65) Prior Publication Data

US 2023/0375488 A1 Nov. 23, 2023

Related U.S. Application Data

(60) Provisional application No. 63/342,764, filed on May 17, 2022.

(51) Int. Cl.
*G01N 25/04* (2006.01)
*B01L 3/00* (2006.01)

(52) U.S. Cl.
CPC ............ *G01N 25/04* (2013.01); *B01L 3/5082* (2013.01); *B01L 2300/0609* (2013.01);
(Continued)

(58) Field of Classification Search
CPC .................. G01N 25/04; B01L 3/5082; B01L 2300/0609; B01L 2300/0627;
(Continued)

(56) References Cited

U.S. PATENT DOCUMENTS 6,337,205 B1 1/2002 Wisniewski
2002/0110907 A1* 8/2002 Wisniewski ........... A01N 1/147
220/560.04
(Continued)

FOREIGN PATENT DOCUMENTS

AT 267519 T 6/2004
CA 2390917 A1 7/2001
(Continued)

OTHER PUBLICATIONS

International Search Report and Written Opinion for PCT/IB2023/055092 issued Aug. 31, 2023, 13 pages.
(Continued)

*Primary Examiner* — Peter J Macchiarolo
*Assistant Examiner* — Mireille S Sadate-Moualeu
(74) *Attorney, Agent, or Firm* — Womble Bond Dickinson (US) LLP

(57) ABSTRACT

An analysis container includes an outer tube and a plurality of inner tubes. The outer tube defines a buffer volume that is configured to receive a buffer material. The plurality of inner tubes is disposed within the buffer volume. Each inner tube has an inner diameter equal to or less than 6 mm and is configured to receive a biopharmaceutical composition therein. The outer tube is configured such that the buffer material and the biopharmaceutical composition are axially frozen.

21 Claims, 12 Drawing Sheets

(52) U.S. Cl.

CPC .................. *B01L 2300/0627* (2013.01); *B01L 2300/0832* (2013.01); *B01L 2300/12* (2013.01); *B01L 2300/1894* (2013.01)

(58) Field of Classification Search

CPC ......... B01L 2300/0832; B01L 2300/12; B01L 2300/1894; B01L 2400/0478; B01L 3/502

See application file for complete search history.

(56) References Cited

U.S. PATENT DOCUMENTS

| | | | | |
|---|---|---|---|---|
| 2019/0082681 | A1* | 3/2019 | Fuhr | ........................ G01K 3/04 |
| 2019/0193075 | A1* | 6/2019 | Fuhr | ........................ G01K 3/04 |

FOREIGN PATENT DOCUMENTS

| | | | |
|---|---|---|---|
| CN | 109152356 | A | 1/2019 |
| DE | 60103498 | T2 | 6/2005 |
| DE | 102016005133 | A1 | 11/2017 |
| DK | 1246524 | T3 | 9/2004 |
| EP | 1246524 | A2 | 10/2002 |
| EP | 3448150 | A1 | 3/2019 |
| EP | 3463668 | A1 | 4/2019 |
| EP | 3463669 | A1 | 4/2019 |
| ES | 2220778 | T3 | 12/2004 |
| JP | 2003519513 | A | 6/2003 |
| JP | 2019516103 | A | 6/2019 |
| JP | 2022009999 | A | 1/2022 |
| JP | 7015789 | B2 | 2/2022 |
| JP | 7274549 | B2 | 5/2023 |
| KR | 20180135961 | A | 12/2018 |
| WO | 0150852 | A2 | 7/2001 |
| WO | 2017186330 | A1 | 11/2017 |
| WO | 2017213586 | A1 | 12/2017 |
| WO | 2017213589 | A1 | 12/2017 |
| WO | 2017213590 | A1 | 12/2017 |
| WO | 2017213591 | A1 | 12/2017 |
| WO | 2017213592 | A1 | 12/2017 |

OTHER PUBLICATIONS

International Preliminary Report on Patentability for PCT/IB2023/055092, issued Nov. 7, 2024, 7 pages.

\* cited by examiner

500

PREPARE STORAGE CONTAINER — 510

ADD STORAGE CONTAINER TO FRAME — 515

PROVIDE MATERIAL — 520

ADD EXCIPENTS TO MATERIAL — 525

LOAD COMPOSITION INTO STORAGE WELL — 530

SUBJECT THE STORAGE CONTAINER TO A PROCESS — 540

UNLOAD COMPOSITION FROM STORAGE WELL — 550

REMOVE COMPOSITION FROM STORAGE CONTAINER — 560

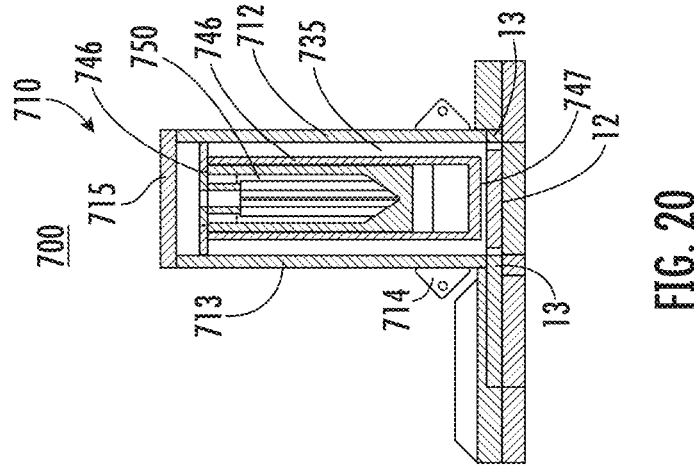
FIG. 20
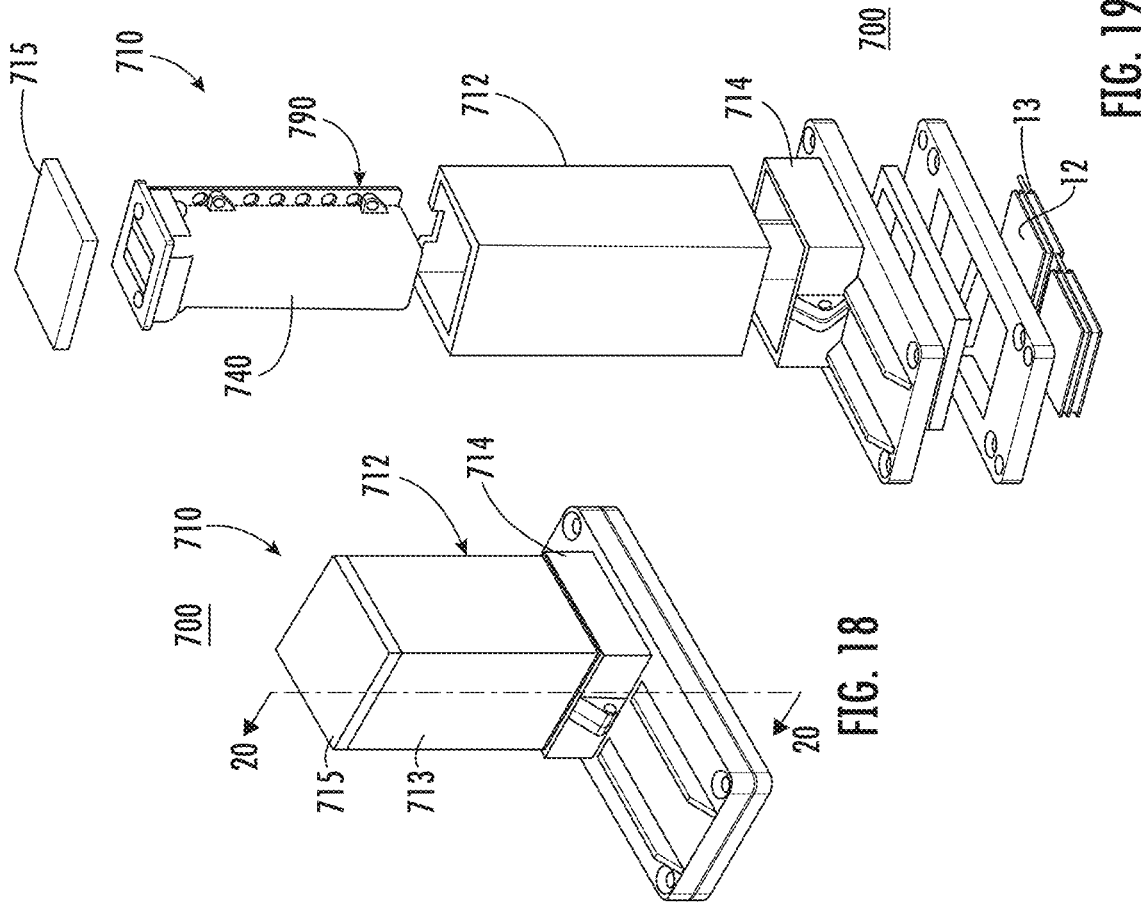
FIG. 19
FIG. 18

SMALL VOLUME SYSTEM AND METHODS OF EVALUATING THE STABILITY OF BIOPHARMACEUTICAL COMPOSITIONS

CROSS-REFERENCE TO RELATED APPLICATION

This application claims the benefit of, and priority to, U.S. Provisional Patent Application Ser. No. 63/342,764, filed May 17, 2022, the entire contents of which are hereby incorporated by reference.

BACKGROUND

1. Technical Field

The present disclosure relates to systems and methods for evaluating the stability of biopharmaceutical compositions and, more specifically, evaluating the stability of small volumes of biopharmaceutical compositions.

2. Discussion of Related Art

Development of biopharmaceutical compositions includes developing protocols for evaluating the effects of freezing, thawing, heating, cooling, storing, or transferring biopharmaceutical compositions. The biopharmaceutical compositions may be monoclonal antibodies (mAbs), therapeutic proteins, vaccines, lipid nanoparticles, viruses, virus banks, exosomes, cell banks, and cell therapy products. The methods and protocols for freezing, thawing, heating, cooling, storing, or transferring of biopharmaceutical compositions may affect the formulation and/or the stability of the biopharmaceutical compositions. To generate protocols, samples of biopharmaceutical compositions must be evaluated through freezing, thawing, heating, cooling, storage, and transfer processes to analyze the effect of the processes on the biopharmaceutical compositions and the stability thereof.

Systems and methods currently exist for process development activities including scale up, scale down, and stability studies of monoclonal antibodies and other therapeutic proteins. The current systems are designed to represent freezing and thawing processes at commercial scale (e.g., Celsius® CFT 8-16L and Celsius® FFT 2-12L available from Sartorius AG) using sample sizes of 30 mL or 100 mL for each container.

Production of new biopharmaceutical compositions may be expensive and may require significant time to produce even small quantities of the new biopharmaceutical compositions. Current systems and processes can require a minimum volume of 30 mL per sample with 10 to 100 samples required for a single experiment or test. As such, during early phases of process development it may be difficult to generate enough material for a single test (e.g., 1 L or more). In addition, to generate scalable processes, the testing materials need to have the similar product contact material and thermal boundary conditions to allow the processes to provide recipes for processes to yield comparable temperature profiles and results which are comparable to larger scale equipment. Further, some biopharmaceutical compositions may require a buffer exchange or additional excipients to be added to reach the final formulation dispensed into final packaging. The formulations of these buffer exchanges or excipients may avoid damage to the biopharmaceutical compositions during bulk freezing, storage, thawing, heating, cooling, transfer, and/or packaging.

SUMMARY

In view of the foregoing, systems and processes to test and evaluate small volumes of biopharmaceutical compositions through a variety of processes and/or a variety of excipients are needed. The systems and processes may provide scalable processes that can be scaled up to production scale once developed.

In an embodiment of the present disclosure, an analysis container includes a storage section that is formed of a product contact material that defines a storage capillary therein. The storage capillary defines a volume of less than 1 mL or 200 μL and is configured to receive a biopharmaceutical composition therein. The storage capillary is configured to be subjected to one or more process of the biopharmaceutical composition.

In embodiments, the storage capillary defines a maximum freeze path. The product contact material and the maximum freeze path allow a freezing process of the biopharmaceutical composition of the storage capillary to be scaled to production scale. The storage capillary may have a diameter in a range of 0.25 mm to 2 mm and a length in a range of 25 mm to 200 mm. The storage capillary may have a diameter of 1 mm and a length of 100 mm.

In some embodiments, the analysis container includes a receiving section that is configured to receive the biopharmaceutical composition. The storage section may define an inlet that is in fluid communication with the receiving section and is configured to receive and expel a biopharmaceutical composition from and to the receiving section through the inlet. The analysis container may include an air chamber. The receiving section may define an outlet opposite the inlet with the air chamber in fluid communication with the storage section via the outlet. The air chamber may be configured to receive and expel gases from the storage section through the outlet. The air chamber may include a plunger that has a first position in which the air chamber defines a first volume and a second position in which the air chamber defines a second volume. The difference between the second volume and the first volume may be equal to a volume of the storage capillary of the storage section.

In certain embodiments, the receiving section includes a cup that is configured to receive the biopharmaceutical composition and an excipient. The cup may be configured to mix the biopharmaceutical composition and the excipient before the biopharmaceutical composition is loaded into the storage capillary of the storage section. The receiving section may be sized and dimensioned to receive a pipette to load and unload biopharmaceutical composition into the storage capillary. The receiving section may be configured to form a seal with the pipette.

In particular embodiments, the analysis container includes a vent filter. The receiving section may define an outlet that is opposite the inlet. The vent filter may be in fluid communication with the storage section via the outlet. The vent filter may be a hydrophobic filter to allow the passage of gas while preventing flow of fluid therethrough. The analysis container may include a mounting structure that defines a through hole. The through hole may be configured to receive the storage capillary therethrough and to position the outlet within the vent filter. The mounting structure may include legs that are configured to be disposed about the vent filter to position the storage capillary relative to the vent filter.

In embodiments, the storage section includes a second storage capillary thermally and hydraulically isolated from the first storage capillary.

In some embodiments, the analysis container includes a thermal element and insulative material that is configured to prevent heat flux in an unwanted direction. The thermal element may be configured to conduct heat into or out of the storage capillary. The thermal element may be configured to contact a thermoelectric cooler to transfer heat into or out of a biopharmaceutical composition disposed within the storage capillary. The thermoelectric cooler may include a controller that is configured to adjust the thermoelectric cooler to a desired temperature.

In certain embodiments, the storage section may define a first lumen and second lumen that are in fluid communication with one another by a connector. The first lumen may include an inlet that is configured to receive a biopharmaceutical composition therethrough. The second lumen may be configured to allow air to enter or egress the first lumen and the second lumen during loading and unloading of the biopharmaceutical composition. The analysis container may include a mounting structure that forms a portion of the connector.

In another embodiment of the present disclosure, a multi-parallel system includes a frame and a plurality of analysis containers according to claim 1. Each analysis container removably secured to the frame. The plurality of analysis containers may include 2 to 100 analysis containers.

In another embodiment of the present disclosure, a method of evaluating a biopharmaceutical composition includes loading, storing, unloading, and evaluating. The loading step includes loading a plurality of analysis containers with less than 1 mL or 200 μL of a biopharmaceutical composition in each analysis container of the plurality of analysis containers. The storing step includes subjecting the plurality of analysis containers containing the biopharmaceutical composition to a freeze/thaw process. The unloading step includes unloading the biopharmaceutical composition from each of the analysis containers. The evaluating step includes evaluating the effects of the freeze/thaw process on the biopharmaceutical composition of each analysis container.

In embodiments, loading and unloading is completed by an automated liquid handling machine.

In some embodiments, the method may include mixing a biopharmaceutical composition in a receiving section of one or more of the plurality of analysis containers. The method may include formulating the biopharmaceutical composition for each analysis container before loading the plurality of analysis containers. Formulating may include adding one or more excipients to a biopharmaceutical composition. Formulating the biopharmaceutical composition may be completed by the liquid handling robot.

In another embodiment of the present disclosure, an analysis container includes an outer tube and a plurality of inner tubes. The outer tube defines a buffer volume that is configured to receive a buffer material. The plurality of inner tubes is disposed within the buffer volume. Each inner tube has an inner diameter equal to or less than 6 mm and is configured to receive a biopharmaceutical composition therein. The outer tube is configured such that the buffer material and the biopharmaceutical composition are axially frozen.

In embodiments, the analysis container includes a tube holding frame that is disposed within the buffer volume of the outer tube. Each inner tube is secured to the tube holding frame. The tube holding frame is monolithically formed with the outer tube. The inner tubes may be monolithically formed with the outer tube and the tube holding frame.

In some embodiments, each inner tube includes a first tube, a second tube, and a connector that fluidly couples the first tube and the second tube to one another. The connector may be U-shaped such that an open end of the first tube and an open end of the second tube are adjacent one another.

In particular embodiments, each inner tube may have a diameter of 1 millimeter. Each inner tube may have a vertical length of 100 millimeters.

In certain embodiments, the analysis container includes a case with the outer tube disposed within the case. The case may include walls that are formed of a heat conductive material that are configured to contact a thermal electric cooler such that the walls are maintained above a freezing temperature of the buffer material while the buffer material is axially frozen.

In embodiments, the analysis container includes a sensor assembly that is secured to a wall of the outer tube. The sensor system includes a plurality of sensors that are vertically spaced apart from one another. Each sensor is in thermal contact with a point on the wall of the outer tube such that the sensor is configured to determine a temperature of the buffer material that is disposed within the outer tube.

In another embodiment of the present disclosure, a method of axially freezing a biopharmaceutical composition includes activating a primary thermal electric cooler (TEC), setting a secondary TEC at a first temperature near a freezing point of a buffer material before activating the primary TEC, and maintaining the secondary TEC at the first temperature until the buffer material and a biopharmaceutical composition are frozen. Activating the primary TEC is to axially freeze contents of an outer tube that includes the buffer material and the biopharmaceutical composition that is disposed in a plurality of inner tubes disposed within each inner tube.

In embodiments, the method includes reducing the secondary TEC to a second temperature below the freezing point of the buffer material after the buffer material and the biopharmaceutical composition are frozen. The second temperature may be in a range of −60 degrees Celsius to −40 degrees Celsius.

In some embodiments, the method includes monitoring a temperature of the biopharmaceutical composition with a sensor assembly in contact with an outer surface of the outer tube. The method may include placing the case on a freezing station such that walls of the case are in thermal contact with the secondary TEC and a bottom of the outer tube is in thermal contact with the primary TEC.

In certain embodiments, the method includes loading the biopharmaceutical composition into each inner tube before activating the secondary TEC. Loading the biopharmaceutical composition includes injection air behind the biopharmaceutical composition to level the biopharmaceutical composition in two vertical tubes of each inner tube.

In particular embodiments, activating the primary TEC includes filling a freezing profile with the primary TEC to axially freeze the buffer material and the biopharmaceutical composition and setting the primary TEC to a second temperature below the freezing point of the buffer material. The method may include thawing the biopharmaceutical composition including setting the secondary TEC to a third temperature near the thawing point of the buffer material, activating the primary TEC to axially thaw contents of the outer tube including the buffer material and the biopharmaceutical composition after setting the secondary TEC to the third temperature, and maintaining the secondary TEC at the third temperature until the buffer material and the biopharmaceutical composition are thawed.

In certain embodiments, the method includes setting the secondary TEC to a fourth temperature above a thawing temperature of the biopharmaceutical composition after the biopharmaceutical composition is thawed. Activating the primary TEC to axially thaw the contents of the outer tube includes controlling the primary TEC through a thawing profile to simulate thawing of a modeled container.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein:

FIG. 18 is a perspective view of a freezing system provided in accordance with embodiments of the present disclosure;

FIG. 19 is a perspective view, with the parts separated, of the freezing system of FIG. 18;

FIG. 20 is a cross-sectional view taken along section line 20-20 of FIG. 18;

DETAILED DESCRIPTION

Figure 1:
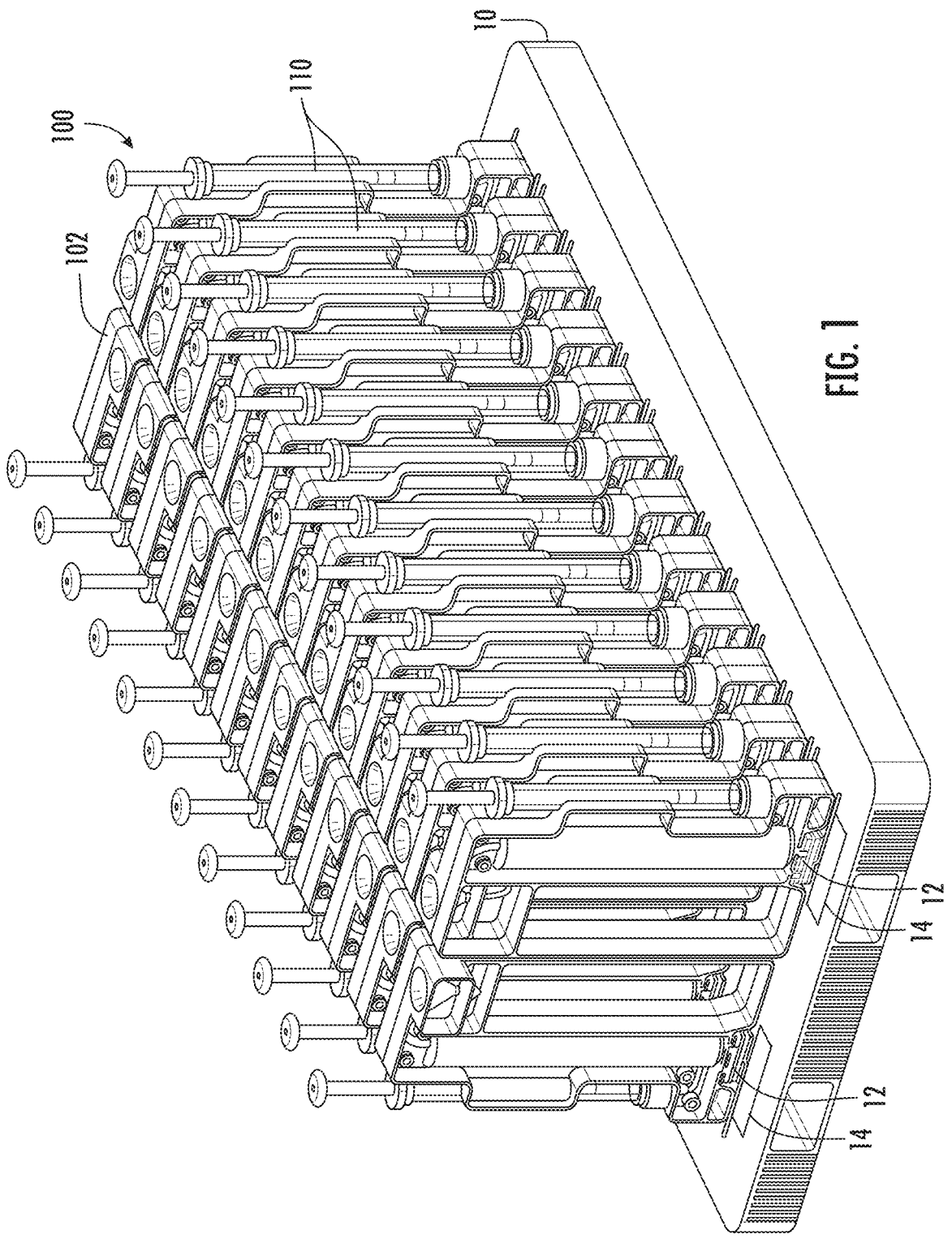
FIG. 1 is a perspective view of a multi-parallel freezing system provided in accordance with an embodiment of the present disclosure including a plurality of analysis containers.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like. Further, as used herein the term "biopharmaceutical compositions" refers to a product coming from biotechnology, culture environments, cell cultures, buffer solutions, artificial nutrition liquids, blood products and derivatives of blood products, a pharmaceutical product, or more generally a product intended to be used in the medical field including, without any limitation, monoclonal antibodies (mAbs), therapeutic proteins, viruses, lipid nanoparticles, vaccines, virus banks, exosomes, cell banks, and cell therapy products.

This application is directed to systems and methods for use in early-stage product development of biopharmaceutical compositions. The systems and methods detailed herein are capable of exploring the impacts of formulation and thermal conditions (including freeze/thaw cycles, elevated temperature liquid storage, etc.) on biopharmaceutical compositions including monoclonal antibodies (mAbs). The systems and methods detailed herein may allow for evaluation of thermal stability, viscosity, shear stress, and other factors of biopharmaceutical compositions. The systems and methods herein may allow for evaluation of how well a particular biopharmaceutical composition can be adapted to process conditions encountered in a manufacturing environment, otherwise known as "developability."

The systems and methods may use 5 mL of biopharmaceutical composition to supply a design of experiments of approximately 60×80 μL (4.8 mL total) to explore the effect of varying a type and/or concentration of different excipients such as buffer components, surfactants, and sugars. In some embodiments, the same design of experiment may explore the impact of different cooling/freezing or heating rates. In certain embodiments, a design of experiment may include holding the biopharmaceutical composition at an elevated temperature, e.g., 30° C. or 40° C., for an extended period to determine the stability of a molecule. In particular embodiments, a design of experiment may evaluate formulations of biopharmaceutical composition and/or cryoprotectants for freezing the biopharmaceutical composition at a temperature of −20° C. or −196° C. The methods may include cell counting, cell viability, and other critical quality attributes (CQA) to evaluate the efficacy of the processes. As used herein, the term "cryogenic" refers to temperatures in a range of −20° C. to −196° C. unless otherwise specified.

Referring now to FIG. 1, an example multi-parallel freezing system 100 is disclosed in accordance with the present disclosure. The multi-parallel system 100 can be used to explore how different formulations of a biopharmaceutical composition are affected by freezing, storing, thawing, or packaging. As shown, the multi-parallel system 100 includes twenty-four analysis containers 110 on a liquid cooling plate 10. The liquid cooling plate 10 may include one or more thermoelectric coolers/heaters (TEC) 12 that engage the analysis containers 110 to transfer heat into or out of the analysis containers 110. Each TEC 12 may be engaged by one or more of the analysis containers 110. In some embodiments, the multi-parallel system 100 may include between 2 and 100 sample or analysis containers. In certain embodiments, the multi-parallel system may include more than 100 analysis containers. The TEC 12 may include a controller 14 that adjusts the TEC 12 to a desired temperature.

Figure 2:
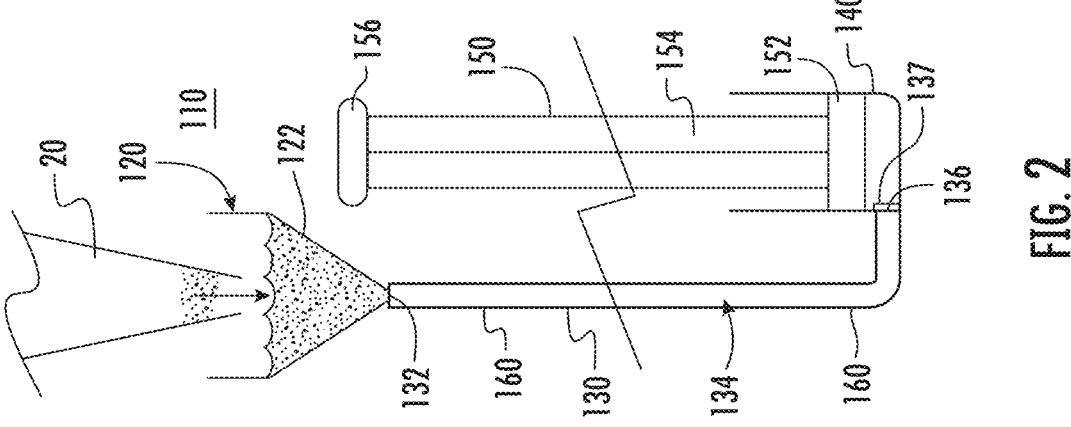
FIG. 2 is a schematic view of an analysis container provided in accordance with the present disclosure prior to loading the analysis container.

With additional reference to FIG. 2, an example sample or analysis container 110 for use in the freezing system 100. The analysis container 110 is configured to receive and hold a small volume of biopharmaceutical composition during a variety of processes to develop scalable recipes or processes for the biopharmaceutical composition. The analysis container 110 may be a single use or consumable container. The analysis container 110 includes a receiving section 120, a storage section 130, an air chamber 140, and a plunger 150.

The receiving section 120 is configured to receive a biopharmaceutical composition for storage within the storage section 130. In some embodiments, the receiving section 120 may be frustoconical in shape to form a cup 122 to receive biopharmaceutical composition. The receiving section 120 may be configured to receive the biopharmaceutical composition from a pipette 20 or a syringe. The cup 122 may be configured to receive a biopharmaceutical composition and an excipient to be mixed with the biopharmaceutical composition. The cup 122 may be configured to mix the biopharmaceutical composition with one or more excipients before the biopharmaceutical composition is loaded into the storage section 130. In some embodiments, mixing of the biopharmaceutical composition with one or more excipients may occur outside of the cup 122 before the biopharmaceutical composition is dispensed into the cup 122.

The storage section 130 includes an inlet 132, a storage well or storage capillary 134, and an outlet 136. The inlet 132 is in fluid communication with the cup 122 of the receiving section 120 to receive the biopharmaceutical composition from the receiving section 120 into the storage capillary 134. The storage capillary 134 is sized to receive a small volume of biopharmaceutical composition with material properties similar to those of larger containers, e.g., 30 mL or 100 mL containers. The storage capillary 134 may have a volume of 10 μL to 1 mL, e.g., 80 μL, 100 μL, 200 μL, or 1 mL. In some embodiments, the storage capillary 134 has a volume less than 1 mL. The storage capillary 134 may be in the form of a conduit that extends between the inlet 132 and the outlet 136. The storage capillary 134 may have a diameter in a range of 0.25 mm to 2 mm and a length in a range of 25 mm to 200 mm. In certain embodiments, the storage capillary 134 may have a diameter of 1 mm and a length of 100 mm. The size of the storage capillary 134 may be sized to have a maximum freeze path length (the distance from the cooled exterior wall to an opposite wall or surface of a composition within the storage capillary 134) scalable to large production equipment. This maximum freeze path or distance may give rise to cryo-concentration or macro-segregation effects that may impact the biopharmaceutical composition being frozen.

The outlet 136 may include a hydrophobic filter 137 to prevent fluid from flowing into the air chamber 140 while allowing gases, e.g., air, to flow through. The filter 137 may be positioned in the air chamber 140 such that when the storage capillary 134 is full, the biopharmaceutical composition is spaced apart from the filter 137. In some embodiments, the biopharmaceutical composition may contact the filter 137 when the storage capillary 134 is full. The storage capillary 134 may be defined by walls formed of a material similar to larger containers such that the product contact material of the storage capillary 134 is the same as larger containers. The product contact material may be a thermoplastic such as a thermoplastic elastomer material such as an ethylene-vinyl acetate copolymer (EVA) or a linear low-density polyethylene (LLDPE). In some embodiments, as the volume of the storage capillary 134 is reduced, the product contact surface area to volume ratio increases such that impacts of extractables or leachables from the product contact material may be exaggerated. In particular embodiments, exaggerated impacts of extractables or leachables may be resolved during analysis of samples from the storage capillary.

The air chamber 140 is in fluid communication with the outlet 136 of the storage section 130. The air chamber 140 is sized to receive a volume of air substantially equal to the volume of the storage capillary 134 such that when the plunger 150 is moved from an empty position to a filled position, a predetermined amount of biopharmaceutical composition is drawn into the storage capillary 134 through the inlet 132 from the cup 122 as detailed below. Likewise, when the plunger is moved from the filled position to the empty position, the predetermined amount of biopharmaceutical composition is expelled through the inlet 132 from the storage capillary 134 as detailed below.

The plunger 150 includes a seal 152, a shaft 154, and a head 156. The seal 152 is disposed within and forms a seal with the air chamber 140. The shaft 154 extends from the seal 152 to the head 156. The shaft 154 is rigid such that the seal 152 moves in concert with the head 156. The head 156 is configured to be engaged to move the seal 152 within the air chamber 140 to change a volume of the air chamber 140 such that air is drawn into and forced out of the air chamber 140. The head 156 may be sized or shaped to be engaged by a technician or by a machine, e.g., a robot or automated filling device.

The analysis container 110 may include one or more sensors 160. The sensors 160 may be a variety of sensors including, but not limited to, a pH sensor, a conductivity sensor, an ultrasonic sensor, a capacitive sensor, a turbidity sensor, or discrete temperature sensors such as a thermocouple, RTD, thermistor, or optical temperature sensor. The sensors 160 may be positioned at locations along the length of the storage capillary 134. The sensors 160 may provide data for analytics of a process or biopharmaceutical composition before, during, or after processes including, but not limited to, freezing, thawing, heating, cooling, storing, or transferring.

Figure 4:
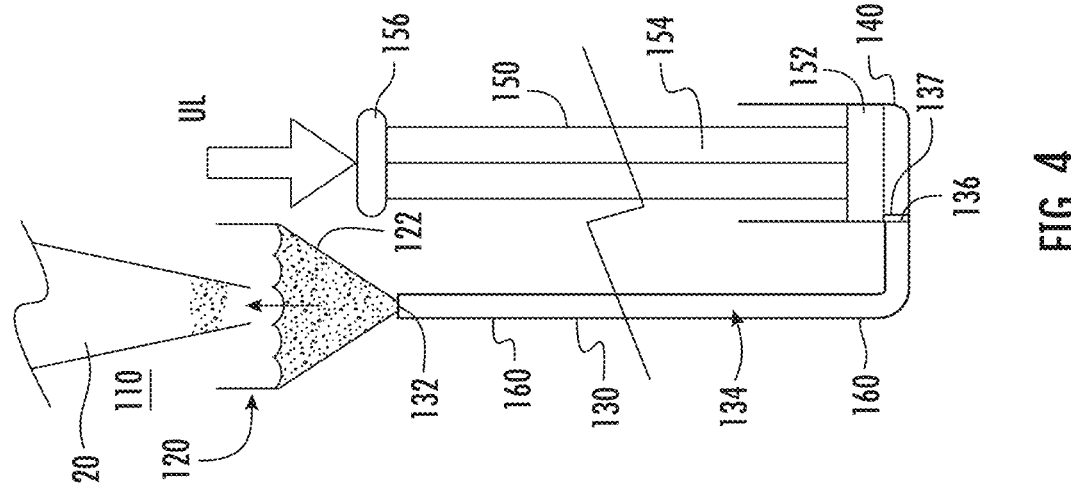
FIG. 4 is a schematic view of the analysis container of FIG. 2 in an unload configuration.
Figure 3:
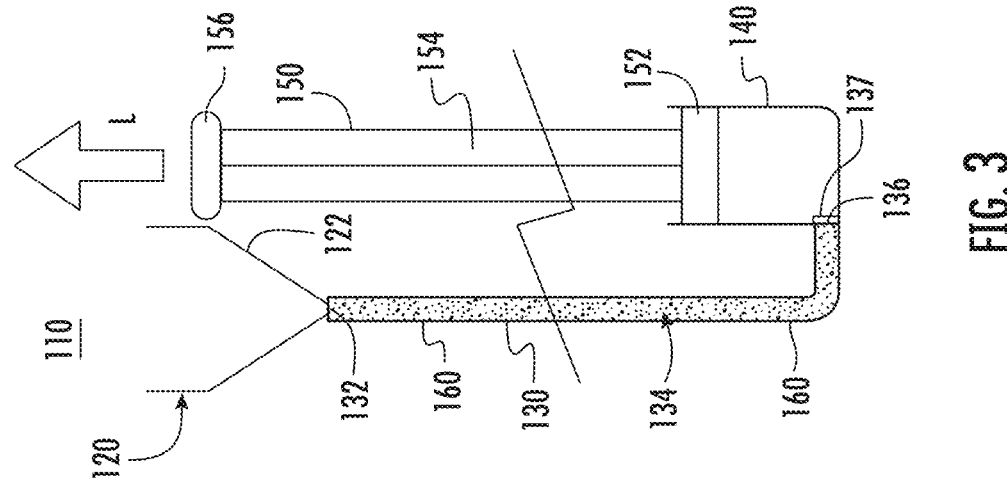
FIG. 3 is a schematic view of the analysis container of FIG. 2 in a freeze/thaw/storage configuration.
Figure 5:
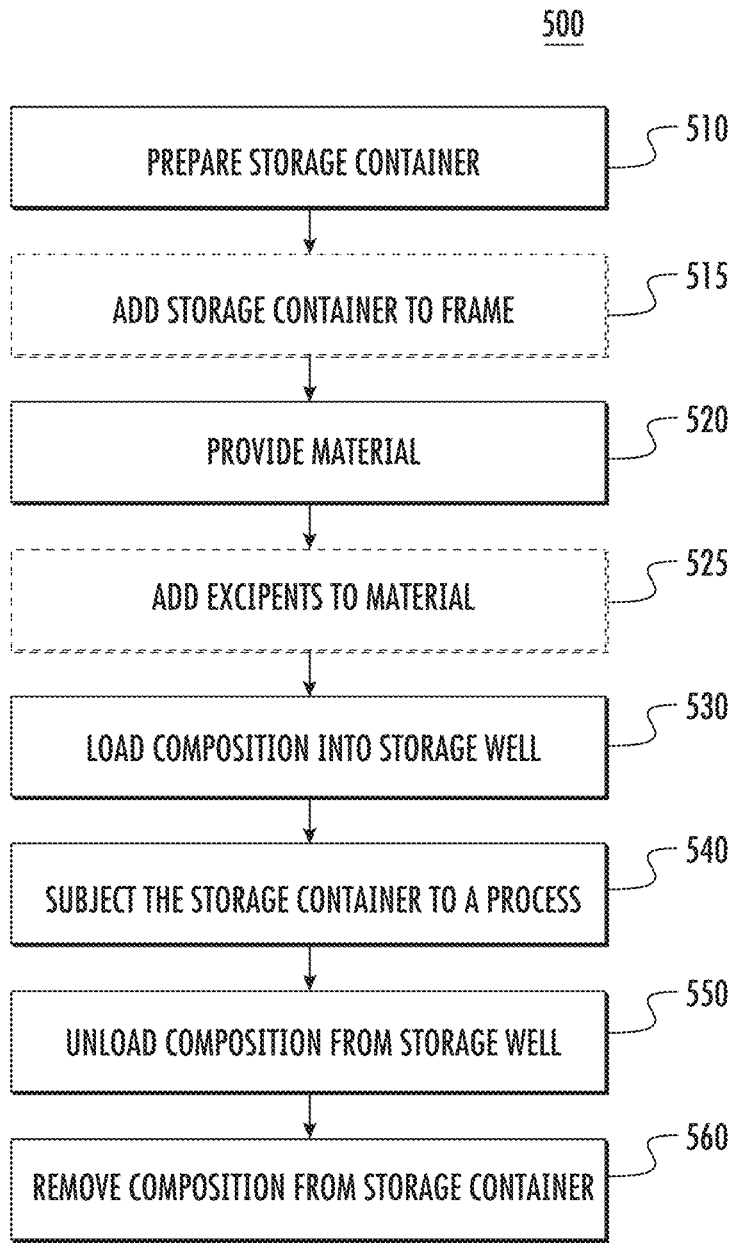
FIG. 5 is a flow chart of a method of loading and unloading an analysis container in accordance with the present disclosure.

Referring now to FIG. 5, a method of loading and unloading an analysis container is detailed in accordance with an embodiment of the present disclosure with reference to the analysis container 110 of FIGS. 2-4 and is referred to generally as method 500. The method 500 may be used to fill an analysis container with a small volume of a biopharmaceutical composition in a range of 10 µL to 200 µL, e.g., 80 µL or 100 µL. In some embodiments, the volume of biopharmaceutical composition may be more than 200 µL.

Initially, the analysis container 110 is prepared to receive a biopharmaceutical composition (Step 510). To prepare the analysis container, the plunger 150 of the analysis container 110 is positioned in the empty position as shown in FIG. 2. In the empty position, the seal 152 is positioned such that the air chamber 140 has a minimum volume. When the analysis container 110 is prepared, air fills the storage capillary 134 and the air chamber 140. The analysis container 110 may be sterilized before use. When the analysis container 110 is prepared, the receiving section 120 may be empty or filled with air.

In some embodiments, the analysis container 110 may be loaded onto a frame or an array 102 of a multi-parallel system 100 (FIG. 1) with additional analysis containers 110 (Step 515). In certain embodiments, a frame 102 may include a range of 10 to 100 analysis containers 110. The analysis container 110 may be loaded or added to the array before or after being loaded with the biopharmaceutical composition. Having multiple analysis containers 110 on a single frame or array 102 may allow for an experiment or test of multiple analysis containers 110 to identical processes as detailed below as part of a multi-parallel system, e.g., multi-parallel system 100 (FIG. 1).

With the analysis container 110 is prepared, the biopharmaceutical composition is provided into the receiving section 120 (Step 520). When the biopharmaceutical composition is provided into the receiving section 120, air may fill the storage capillary 134 and the air chamber 140. The surface tension and pressure of air within the storage capillary 134 and the air chamber 140 may prevent the biopharmaceutical composition from entering the storage capillary 134 such that the biopharmaceutical composition may remain in the receiving section 120. The biopharmaceutical composition may be provided by a variety of means including, but not limited to, a pipette, a syringe, a nozzle, or other suitable means.

In some embodiments, the method 500 may include adding one or more excipients to the biopharmaceutical composition (Step 525). The method 500 may include mixing in the receiving section 120. Mixing in the in the receiving section 120 may include orbital movement of the analysis container 110 such that the biopharmaceutical composition and other fluids in the cup 122 may be mixed before being loaded into the storage capillary 134. In certain embodiments, the biopharmaceutical composition is mixed with excipients prior to being provided into the receiving section 120. For example, the mixing may occur in a microwell plate. In particular embodiments, mixing may occur by loading the biopharmaceutical composition and then one or more excipients into a loading means and then loaded and unloaded one or more times to mix the biopharmaceutical composition with the one or more excipients.

When the receiving section 120 includes a volume of the biopharmaceutical composition, the plunger 150 is moved in a first direction indicated by arrow "L" of FIG. 3 to load biopharmaceutical composition into the storage capillary 134 (Step 530). As the plunger 150 is moved in the first direction, the seal 152 is moved to increase a volume of the air chamber 140. When the volume of the air chamber 140 is increased, air is drawn from the storage capillary 134 into the air chamber 140 such that a volume of the biopharmaceutical composition is drawn into the storage capillary 134. The volume of the biopharmaceutical composition drawn into the storage capillary 134 is equal to the increase in volume of the air chamber 140 as a result of the receiving section 120 being open to the environment or having a vent to equalize pressure with an ambient environment. The plunger 150 may be moved in the first direction by a technician engaging the head 156 of the plunger 150 to move the plunger 150 in the first direction. Alternatively, the plunger 150 may be moved in the first direction by a machine or a robot engaging the head 156 or the shaft 154 of the plunger 150 to move the plunger 150 in the first direction. The air chamber 140 may have one or more stops to engage the seal 152 to limit an amount of movement of the seal 152 into or out of the air chamber 140. The volume of the biopharmaceutical composition within the storage capillary 134 may be in a range of 10 µL to 200 µL, e.g., 80 µL or 100 µL.

With the biopharmaceutical composition disposed within the storage capillary 134, an excess of biopharmaceutical composition within receiving section 120 may be removed. The excess biopharmaceutical composition may be removed by a pipette or by tipping the analysis container 110 to pour the excess material out of the receiving section 120. The surface tension and/or the pressure within the air chamber 140 may retain the biopharmaceutical composition within the storage capillary 134. The receiving section 120 may be sealed to prevent contamination of the biopharmaceutical composition within the storage capillary 134. In some embodiments, the receiving section 120 may be sealed with a dust cap that seals the receiving section 120. The dust cap may inhibit evaporation of the biopharmaceutical composition within the storage capillary 134. In some embodiments, excess biopharmaceutical composition may be removed by a loading means such as a pipette or syringe.

When the biopharmaceutical composition is within the storage capillary 134, the entire analysis container 110 may be subjected to a process (Step 540). The process may include, but not be limited to, one or more of a freezing process, a thawing process, a heating process, a cooling process, a storing process, or a transferring process. In some embodiments, the process may include multiple freeze/thaw cycles. In certain embodiments, the process may be a storage process in which the storage capillary 134 is maintained at an elevated temperature, e.g., 40° C. The process may be a test protocol to be scaled to a laboratory or production scale, generally by approximating the thermal boundary conditions.

When the processes are completed, the biopharmaceutical composition is unloaded from the storage capillary 134 (Step 550). To unload the biopharmaceutical composition from the storage capillary 134, the plunger 150 is moved in a second direction as indicated by arrow "UL" in FIG. 4 to unload the biopharmaceutical composition from the storage capillary 134. The second direction may be opposite the first direction. As the plunger 150 is moved in the second direction, the seal 152 is moved to decrease the volume of the air chamber 140 and thus, increase a pressure of air within the air chamber 140 and/or the storage capillary 134 such that the biopharmaceutical composition is forced out of the storage capillary 134 and into the receiving section 120. The plunger 150 may be moved in the second direction by a technician engaging the head 156 of the plunger 150 to move the plunger 150 in the second direction. Alternatively, the plunger 150 may be moved in the second direction by a machine or a robot engaging the head 156 or the shaft 154 of the plunger 150 to move the plunger 150 in the second direction. The air chamber 140 may have one or more stops to engage the seal 152 to limit the amount of movement of the seal 152 into or out of the air chamber 140.

With the biopharmaceutical composition disposed in the receiving section 120, the biopharmaceutical composition is removed from the analysis container 110 (Step 560). The biopharmaceutical composition may be removed from the analysis container 110 with a pipette or a syringe. In some embodiments, the biopharmaceutical composition may be removed by tilting the analysis container 110.

In one example process, samples may be loaded into an array of 24, 48, or more analysis containers 110 using a total of 5 mL of a biopharmaceutical composition and mixed with excipients per a design of experiment specification which may include mixing. After loading the analysis containers 110, the analysis containers 110 may be subjected to one or more freeze/thaw cycles each lasting in a range of 4-48 hours over the course of up to six days. After the samples of the biopharmaceutical composition are unloaded from the analysis containers 110, the samples of the biopharmaceutical composition are transferred to a microwell plate for analysis. The analysis may include size exclusion chromatography for measurement of aggregation, NT.6 for measurement of activity, or a ForteBio system such as an Octet® system. The analysis containers 110 and multi-parallel system 100 may allow for this process to be fully automated without intervention of a technician.

Figure 7:
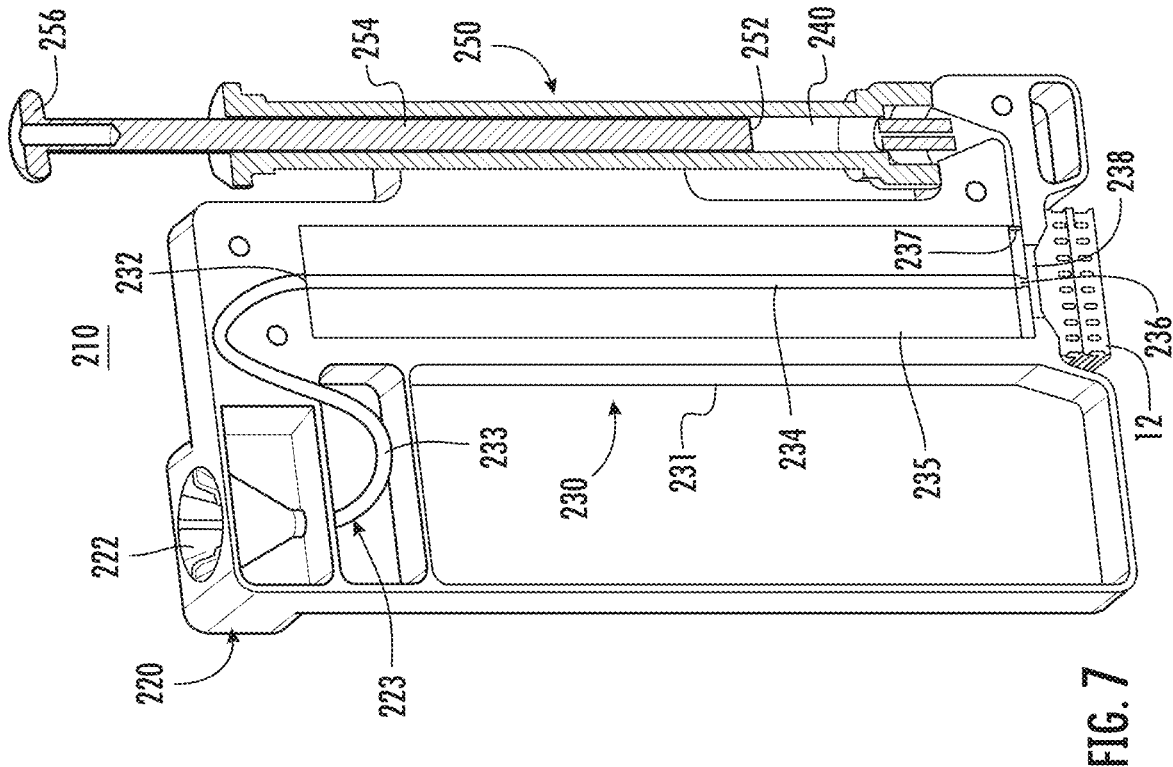
FIG. 7 is a cutaway view of the analysis container of FIG. 6.
Figure 6:
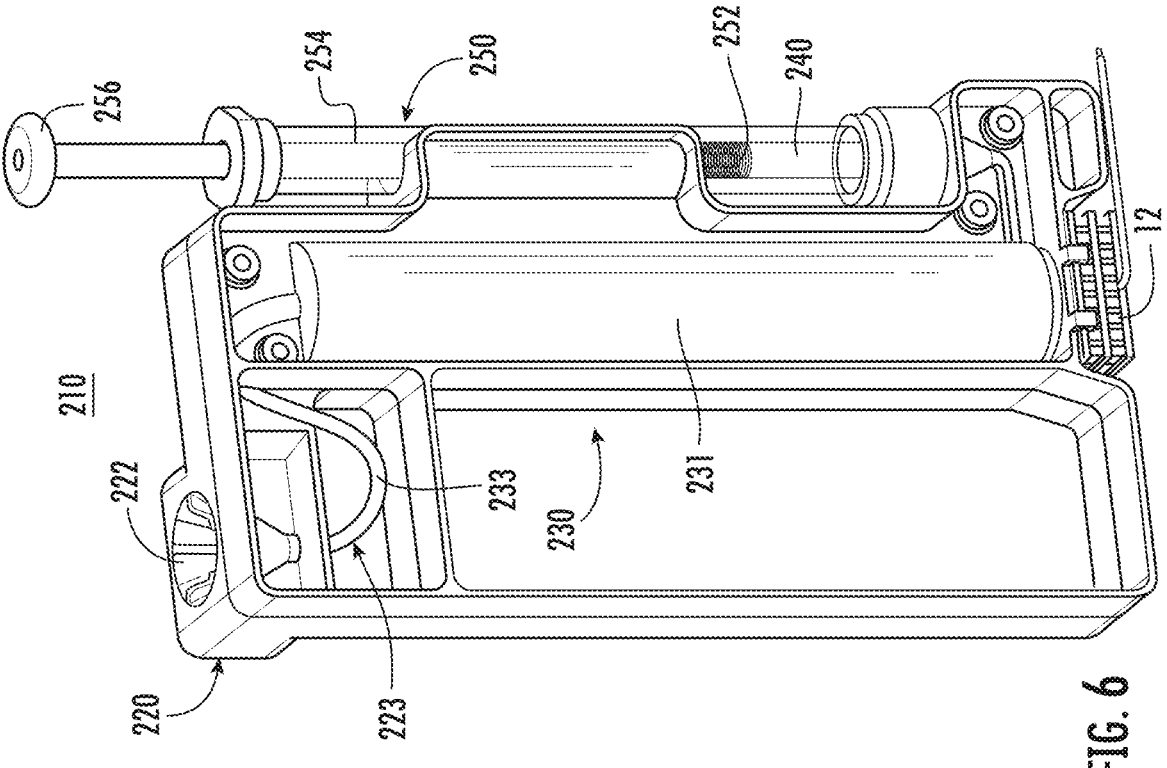
FIG. 6 is a perspective view of another analysis container provided in accordance with the present disclosure.

Referring now to FIGS. 6 and 7, another example analysis container 110 for use in the freezing system 100 and to perform method 500 is provided in accordance with the present disclosure and is referred to generally as analysis container 210. Similar elements of the analysis container 210 are represented with a similar label to the elements of the analysis container 110 with a preceding "2" replacing the preceding "1" and will not be detailed herein for reasons of brevity except for the differences with the analysis container 110.

The analysis container 210 includes a receiving section 220, a storage section 230, an air chamber 240, and a plunger 250. The receiving section 220 includes a receiving cup 222 and an input tube 223 that extends to the inlet 232 of the storage capillary 234. The input tube 223 may include a trap 233 to prevent unwanted movement of material between the receiving cup 222 and the inlet 232 of the storage capillary 234. The trap 233 may be in the form of an s-bend.

The storage section 230 may include an outer shell 231 and an insulative material 235. The storage capillary 234 may be disposed within the insulative material 235. The storage section 230 may include a thermal element 238 at the bottom of the storage capillary 234. The thermal element 238 is configured to transmit heat into and out of the storage capillary 234. The thermal element 238 may be configured to contact the TEC 12 to conduct heat into or out of the storage capillary 234. The insulative material 235 within the outer shell 231 may prevent heat flux in unwanted directions as heat is transferred through the thermal element 238. The insulative material 235 and the thermal element 238 may replicate a freezing, heating, cooling, and thawing of laboratory or production equipment e.g., from the bottom of the storage capillary 234. Transmitting heat into and out of the storage capillary 234 via the thermal element 238 and/or the TEC 12 may allow for cryo-concentration or macro-segregation effects on a composition being frozen to be analyzed. As such, replicating the freeze path length of the laboratory or production equipment is important to replicate the maximum freeze path and/or the product contact material to allow for a process or composition within the storage capillary to be analyzed for a process to be scaled up.

Figure 9:
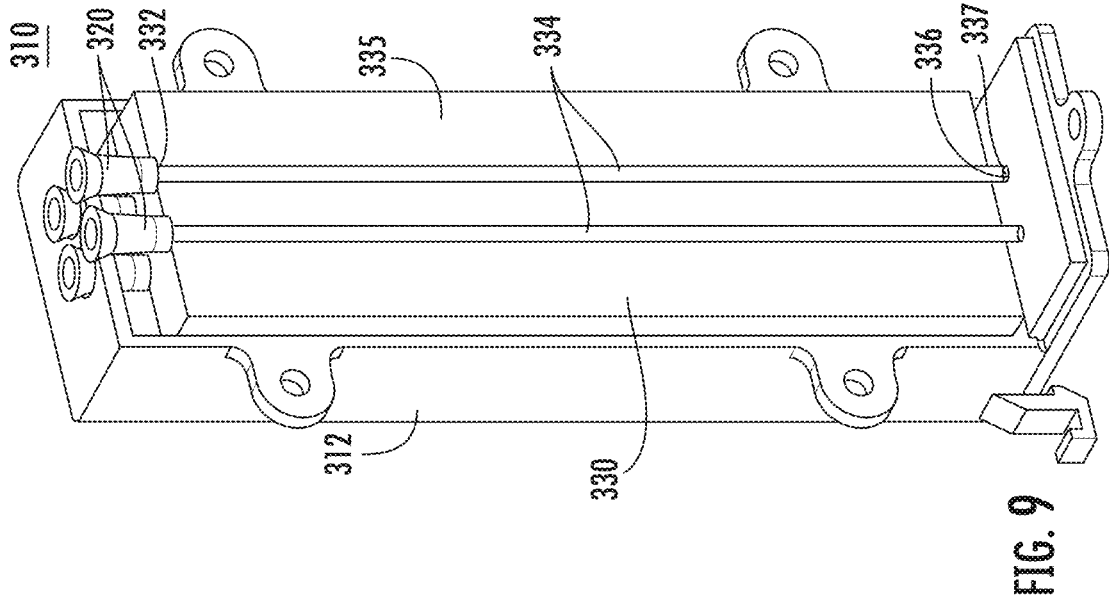
FIG. 9 is a cutaway view of the analysis container of FIG. 8.
Figure 8:
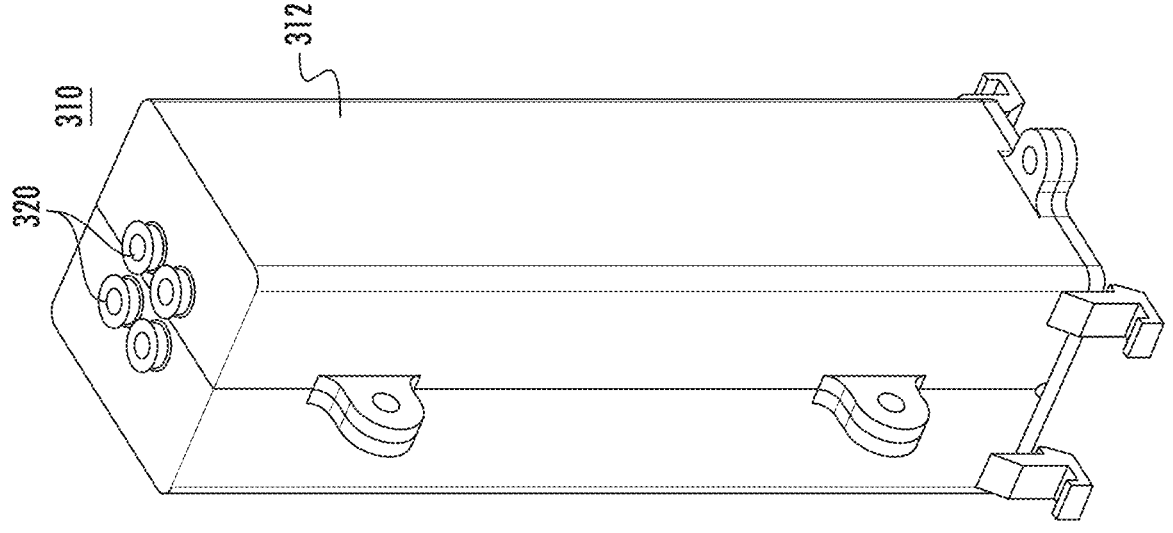
FIG. 8 is a perspective view of another analysis container provided in accordance with the present disclosure including multiple storage capillaries.

With reference to FIGS. 8 and 9, another analysis container 310 is provided in accordance with the present disclosure. The analysis container 310 includes elements similar to the analysis container 210 detailed above with the similar elements including a preceding "3" replacing the preceding "2" of the similar element of the analysis container 210 and will not be detailed herein for brevity except for differences with the analysis container 210.

The analysis container 310 may include a case 312 and an insulative material 335 disposed within the case 312. The analysis container 310 may include multiple storage capillaries 334 defined through the insulative material 315. As shown, the analysis container 310 includes four storage capillaries 334. In some embodiments, the analysis container 310 may include a single storage capillary 334 or a plurality of storage capillaries 334 in a range of two to sixteen storage capillaries 334, e.g., four storage capillaries 334. Each storage capillary 334 may have a similar diameter and length to one another. The storage capillaries 334 may be spaced apart from one another such that the storage capillaries 334 are thermally isolated from one another by the insulative material 335.

Each of the storage capillaries 334 includes a receiving section 320 that is shaped to mate with an input device, e.g., a pipette or syringe. In some embodiments, the receiving section 320 is shaped to mate with a pipette tip to receive a biopharmaceutical composition from the pipette tip. In some embodiments, the receiving section 320 may be configured to form a seal with a pipette tip. The output 336 of the storage capillary 334 includes a hydrophobic filter 337. The hydrophobic filter 337 allows the biopharmaceutical composition to flow into the storage capillary 334 and for gases, e.g., air, to flow out of the storage capillary 334. As a result of the hydrophobic filter 337 allowing air to escape the storage capillary 334, the biopharmaceutical composition flows from the receiving section 320 into the storage capillary 334. As such, any mixing of the biopharmaceutical composition is performed before the material is loaded into the receiving section 320. In some embodiments, mixing may be done in a microwell plate. The mixing may be completed by drawing and expelling the biopharmaceutical composition in and out of a pipette.

The case 312 may include a thermal element (not explicitly shown) disposed at a base of the analysis container 310. The thermal element may be configured to conduct heat into or out of the storage capillaries 334.

Figures 10, 11, 12:
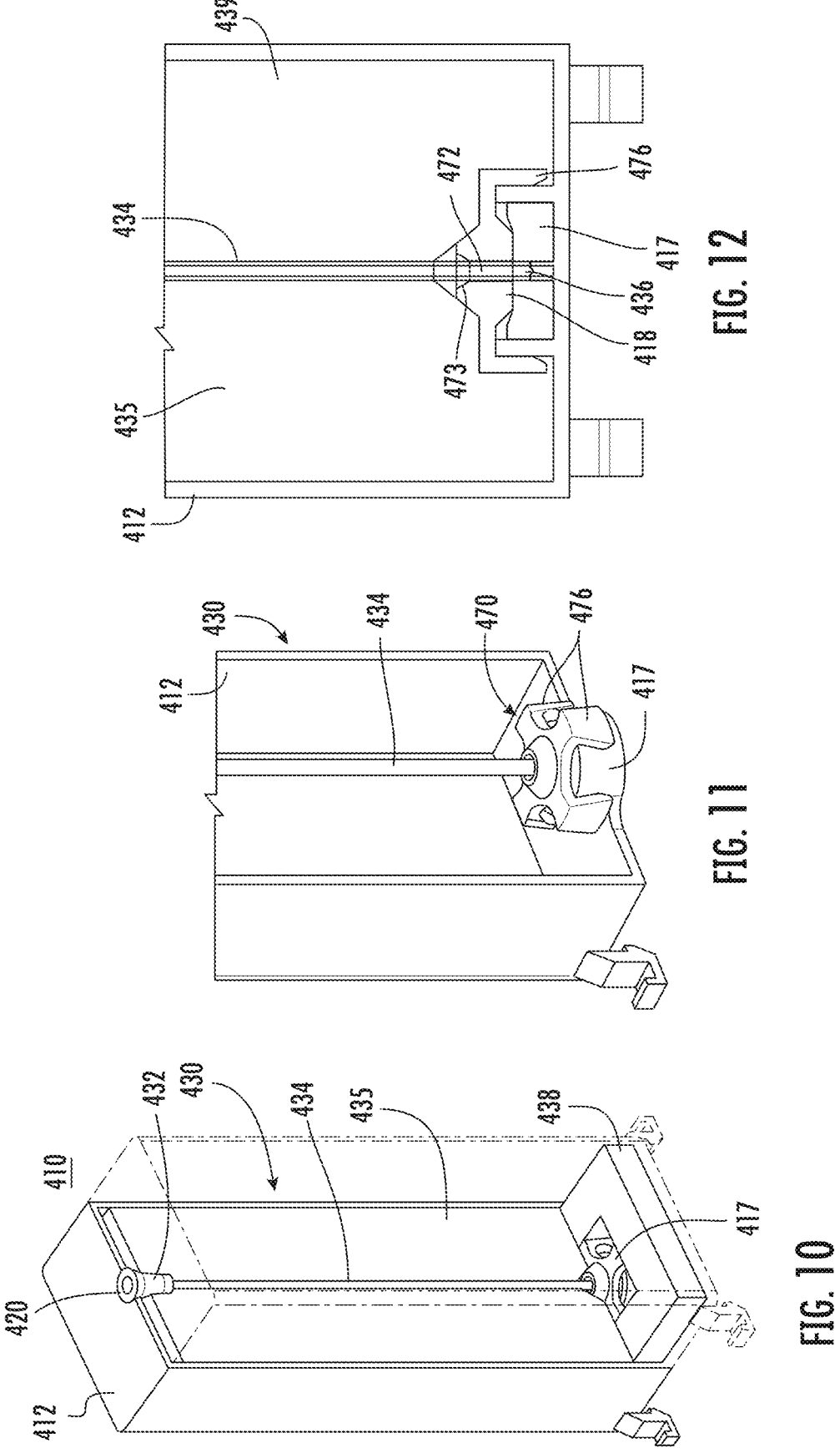
FIG. 10 is a cutaway view of another analysis container provided in accordance with the present disclosure.
FIG. 11 is an enlarged view of the base of the analysis container of FIG. 10.
FIG. 12 is a cross-sectional view of the base of the analysis container of FIG. 11.

With reference to FIGS. 10-12, another analysis container 410 is provided in accordance with the present disclosure. The analysis container 410 includes elements similar to the analysis container 310 detailed above with the similar elements including a preceding "4" replacing the preceding "3" of the similar element of the analysis container 310 and will not be detailed herein for brevity except for differences with the analysis container 310.

The analysis container 410 may include a case 412 and an insulative material 435 disposed within the case 412. As shown, the analysis container 410 includes a single storage capillary 434 in the storage section 430 disposed within the insulative material 435. In some embodiments, the storage section 430 may include a range of two to sixteen storage capillaries disposed within the insulative material 435. The storage capillary 434 is thermally isolated within the case 412.

The case 412 includes a vent filter 417 disposed in the bottom of the case 412. The vent filter 417 may be a Porex® vent filter. The vent filter 417 may be positioned to receive the outlet 436 of the storage section 430. In some embodiments, the case 412 includes multiple vent filters 417 with a vent filter 417 for each of the storage capillaries 434 of the storage section. In certain embodiments, the vent filter 417 is configured to receive multiple storage capillaries 434. In particular embodiments, the vent filter 417 may receive multiple storage capillaries with each storage capillary 434 sharing a single vent filter 417.

The storage section 430 includes a mounting structure 470 adjacent the outlet 436. The mounting structure 470 may include a through hole 472 sized to receive a storage capillary 434 therethrough. The mounting structure 470 may include a pocket 473 defined about the through hole 472. The storage capillary 434 may include an annular ring 439 that extends about the storage capillary 434 and is sized and dimensioned to be received in the pocket 473. The pocket 473 may center the storage capillary 434 relative to the mounting structure 470. The annular ring 439 may be spaced from the outlet 436 such that the storage capillary 434 extends through the through hole 472 and is disposed within the vent filter 417.

The mounting structure 470 includes one or more legs 476 that extend outward from the through hole 472 and extend about the vent filter 417 to position and secure the storage capillary 434 about the vent filter 417. The vent filter 417 may define a depression 418 that receives a portion of the mounting structure 470. The depression 418 may position the mounting structure 470 relative to the vent filter 417 as shown in FIG. 12. In some embodiments, the vent filter 417 may be compressible such that the depression is formed when the mounting structure 470 engages the vent filter 417. The engagement between the vent filter 417 and the mounting structure 470 may seal the vent filter 417 to prevent liquid escape from the storage capillary 434.

Figures 13, 14, 15:
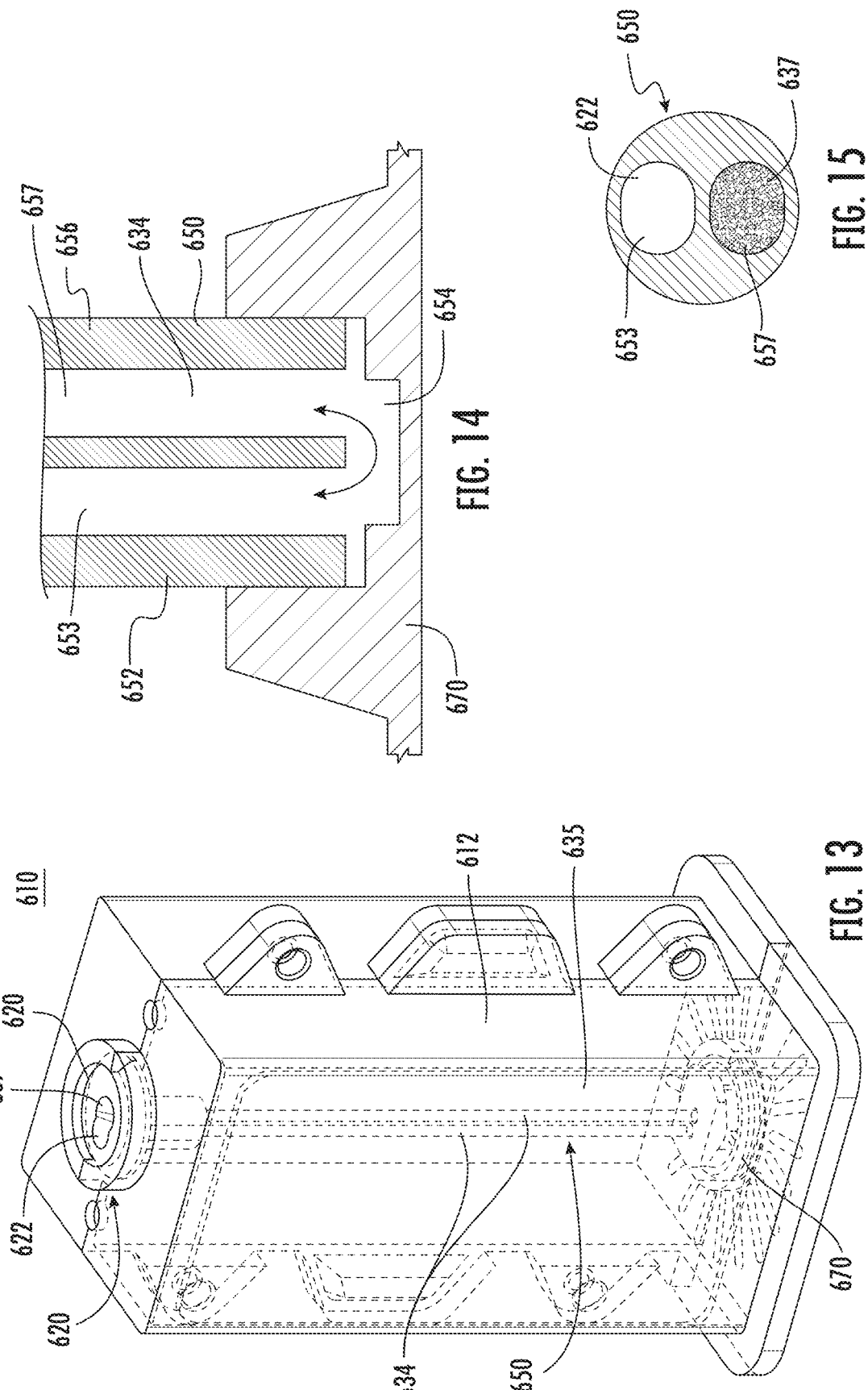
FIG. 13 is a perspective view of another analysis container provided in accordance with the present disclosure including a multi-lumen storage section.
FIG. 14 is a vertical cross-sectional view of a portion of the analysis container of FIG. 13.
FIG. 15 is a horizontal cross-sectional view of a portion of the multi-lumen storage section.

With reference to FIGS. 13-15, another analysis container 610 is provided in accordance with the present disclosure. The analysis container 610 includes elements similar to the analysis container 310 detailed above with the similar elements including a preceding "6" replacing the preceding "3" of the similar element of the analysis container 310 and will not be detailed herein for brevity except for differences with the analysis container 310.

The analysis container 610 may include a case 612 and an insulative material 635 disposed within the case 612. The analysis container 610 includes a double lumen tube 650 forming a storage capillary 634. The tube 650 defines a first lumen 653 and a second lumen 657. The first and second lumens 653, 657 are in fluid communication with one another via a connector 654. In embodiments, the tube 650 is a multi-lumen tube of monolithic construction that defines the first lumen 653 and the second lumen 657 therethrough. An exemplary 2-lumen tube may be available from Raumedic AG. In certain embodiments, the tube 650 is formed of a first tube 652 and the second tube 656 that are joined together by the connector 654.

The connector 654 may be formed as a U-shaped connector that places the first lumen 653 in fluid communication with the second lumen 657. The connector 654 may be secured to the tube 650 or the first tube 652 and the second tube 656 by bonding, adhering, or welding. In some embodiments, the connector 654 may be formed from a mounting structure 670 disposed in the bottom of the case 612. The tube 650 may be press fit into the mounting structure such 670 that the mounting structure 670 and the tube 650 form a seal with the first lumen 653 in fluid communication with the second lumen 657 via the connector 654 formed at least partially by the mounting structure 670. The first lumen 653 and the second lumen 657 may have the same diameter or may have different diameters. In certain embodiments, the mounting structure 670 may be formed of a material of high thermal conductance to transfer heat into or out of the storage capillary formed by the first and second lumen 653, 657. For example, the mounting structure 670 may be formed of a metal or a plastic with high thermal conductivity. In some embodiments, a thermal interface material may be positioned between the mounting structure 670 and the thermoelectric cooler (TEC) 12. Such a thermal interface material may be a filled silicone.

The first lumen 653 includes an inlet 622 for the storage capillary 634 that is configured to receive and/or expel a biopharmaceutical composition into or from the storage capillary 634 adjacent a top of the container 610. The second lumen 657 includes a vent filter 637 adjacent the top of the container 610. The vent filter 637 may be a hydrophobic filter or membrane to prevent entry or egress of liquid therethrough. In certain embodiments, the second lumen 657 is open without a vent filter therein.

Figure 16:
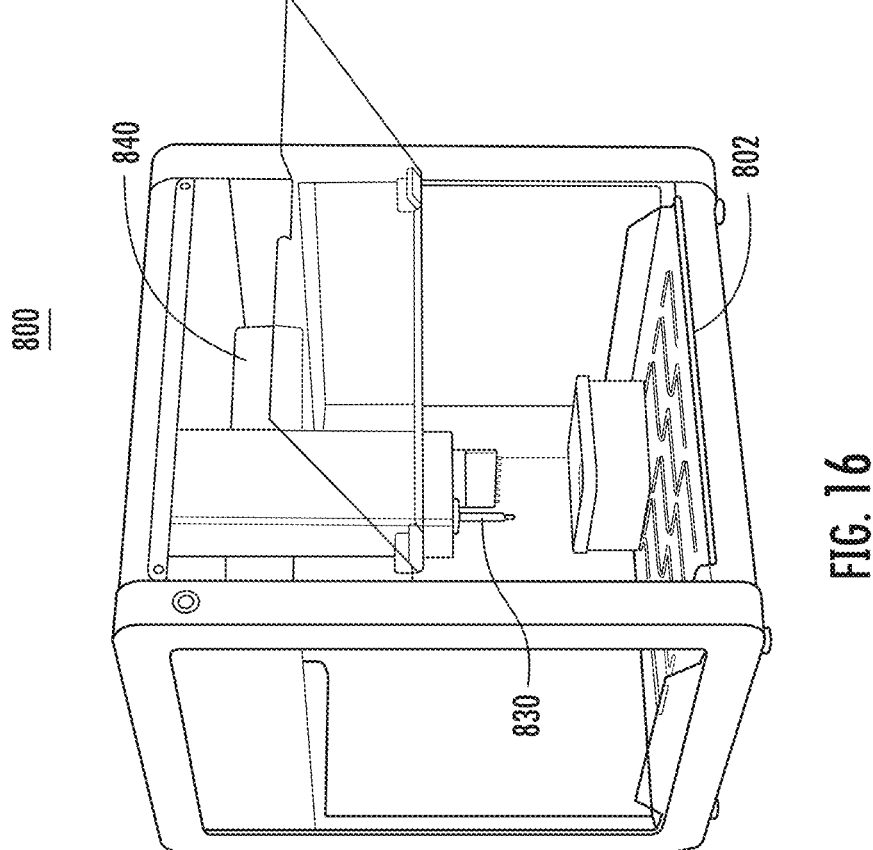
FIG. 16 is a perspective view of a liquid handling robot provided in accordance with the present disclosure.
Figures 21, 22:
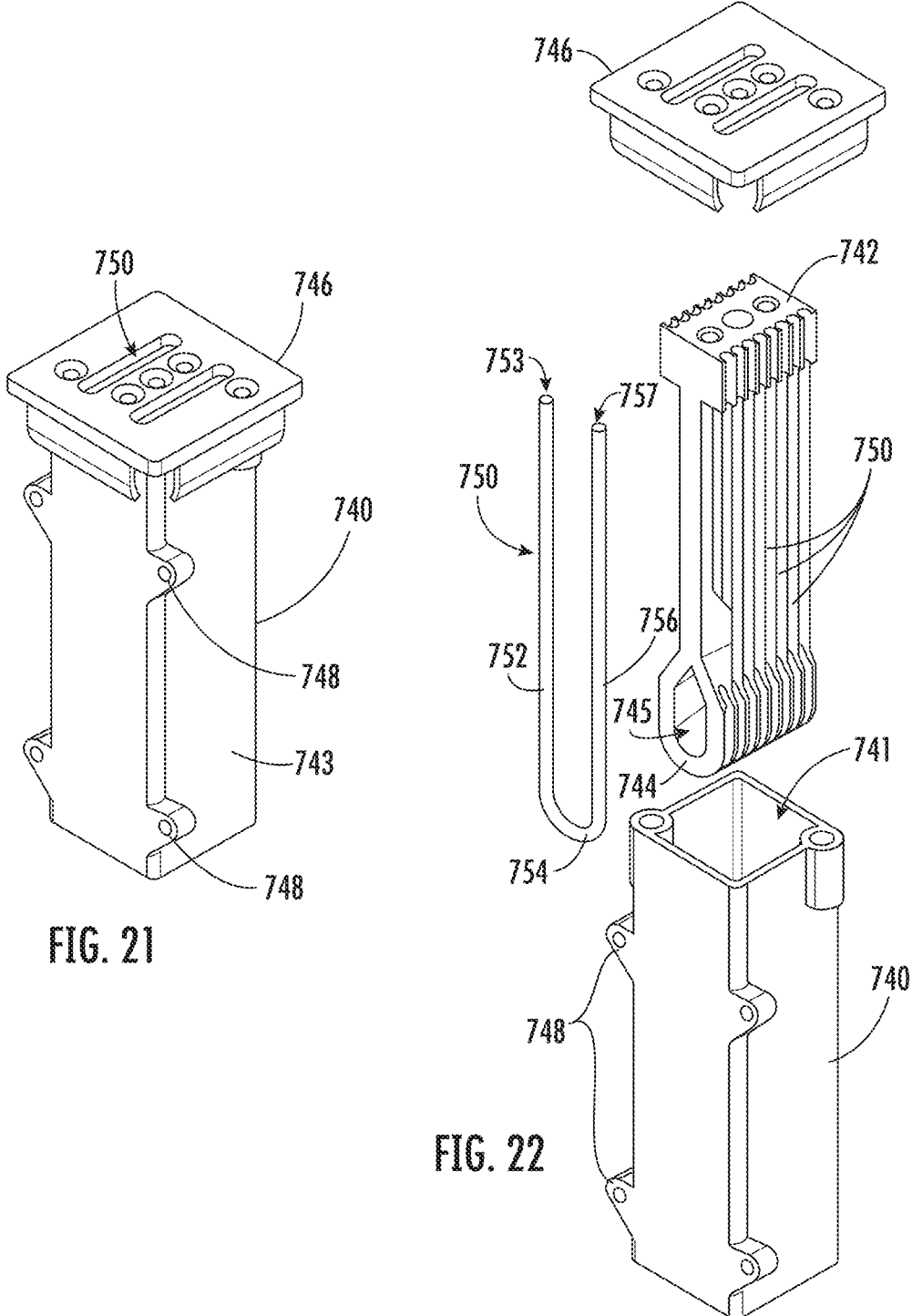
FIG. 21 is a perspective view of another analysis container provided in accordance with embodiments of the present disclosure.
FIG. 22 is a perspective view, with parts separated, of the analysis container of FIG. 21.

In use, a biopharmaceutical composition is loaded into the first lumen 653 via the inlet 622. The biopharmaceutical composition may be loaded via a pipette or a syringe. In some embodiments, the biopharmaceutical composition may be loaded via a robot, e.g., robot 800 (FIG. 16). The biopharmaceutical composition may be in liquid form such that the composition flows through the first lumen 653, the connector 654, and into the second lumen 657. The level of the biopharmaceutical composition may substantially equal in the first lumen 653 and the second lumen 657 as a result of gravity. In certain embodiments, capillary forces of the lumens 653, 657 may be equalized by pushing and/or pulling air into or out of the first lumen 653 and the second lumen 657. The position of the vent filter 637 may allow for loading the lumens 653, 657 without the biopharmaceutical composition contacting the vent filter 637. The vent filter 637 or open end of the second lumen 657 configured to allow air to enter or egress from the first lumen 653 and the second lumen 657 during loading and unloading of a biopharmaceutical composition.

In certain embodiments, when the first lumen 653 is loaded, capillary forces within the first lumen 653 prevent the biopharmaceutical composition from flowing through the connector 654 and into the second lumen 657. The first lumen 653 may be loaded until the biopharmaceutical composition reaches the connector 654. In particular embodiments, the biopharmaceutical composition may enter the connector 654 and be prevented from flowing into the second lumen 657. For example, capillary forces in the second lumen 657 may prevent the biopharmaceutical composition from flowing into the second lumen 657. In some embodiments, gas may be drawn from the second lumen 657 to draw the biopharmaceutical composition into the first lumen 653 until the biopharmaceutical composition fills the first lumen 653 without entering the second lumen 657. The capillary forces of the first lumen 653 may allow for the first lumen 653 to reproduce a capillary length of a storage container, e.g., a fluid bag.

The analysis containers 210, 310, 410, 610 may not have a plunger such as the plunger 150 of the analysis container 110. The elimination of the plunger may allow for a reduced footprint of the analysis containers 210, 310, 410, 610 as compared to the analysis container 110. In addition, the analysis containers 210, 310, 410, 610 may have simplified loading and unloading without needing to move a plunger.

Figure 17:
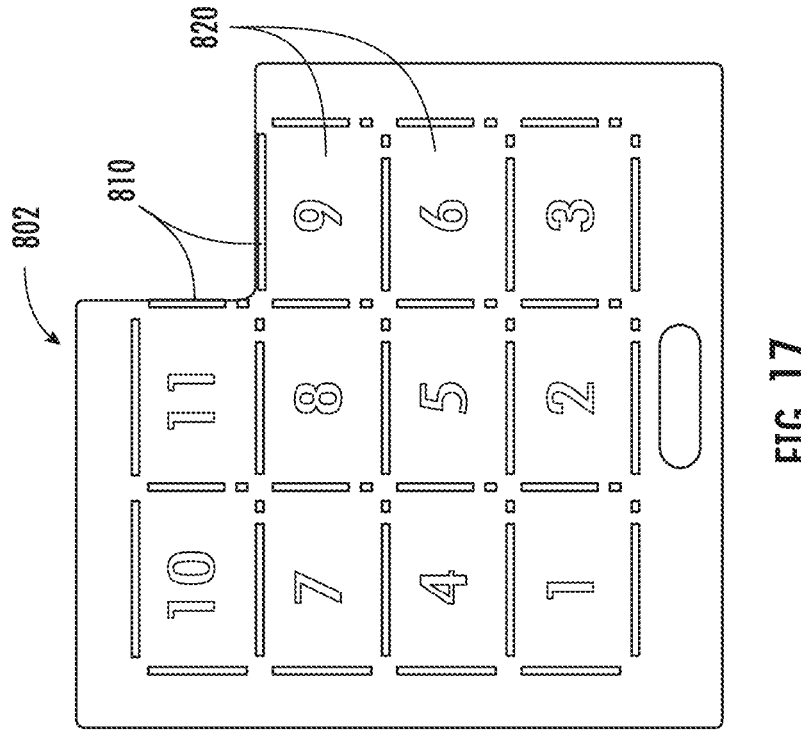
FIG. 17 is a plan view of a plate of the robot of FIG. 16.

Referring now to FIGS. 16 and 17, a liquid handling robot 800 is disclosed in accordance with an embodiment of the present disclosure. The robot 800 may be used to fill the analysis containers disclosed herein, e.g., analysis containers 110, 210, 310, 410, 610. The robot 800 includes a plate 802 having one or more slots 810 that are each configured to receive an adapter 820. The adapters are sized and dimensioned to receive an analysis container, e.g., analysis container 110, 210, 310, 410, 610. In some embodiments, the plate 802 includes slots or zones 810 that include equipment or materials for handling materials or supply materials. For example, the plate 802 may include a zone having a plurality of pipette tips, a zone for waste material, a zone for excipient storage, a zone for biopharmaceutical composition loading, a zone for unloading, and/or a zone for mixing biopharmaceutical compositions with excipients.

The robot 800 includes a pipette 830 and a gantry 840. The gantry 840 supports and moves the pipette 830 to provide fluid to each analysis container received in the slots 810. The robot 800 may be configured to mix, load, and unload a biopharmaceutical composition from an analysis container automatically. An example liquid handling robot 800 may be model OT-2 available from Opentrons.

In embodiments, the robot 800 may include one or more sensors or instruments to measure a biopharmaceutical composition being handled by the robot 800. The sensors or instruments may be disposed in line with the fluid handling or may be disposed in a slot 810 of the robot 800 to allow for analysis of the biopharmaceutical composition. In embodiments, the robot 800 may include a viscosity sensor to measure a viscosity of a biopharmaceutical composition. Such a viscosity sensor may be positioned to measure a viscosity of a biopharmaceutical composition flowing through the robot 800, e.g., through the pipette 830 of the robot 800. In some embodiments, the robot 800 may include a shear stress cell to subject the biopharmaceutical composition to before and/or after loading the biopharmaceutical composition into an analysis container.

Referring to FIGS. 18-22, another analysis container 710 is provided in accordance with the present disclosure. The analysis container 710 includes elements similar to the analysis container 610 detailed above with similar elements including a preceding "7" replacing the preceding "6" of the similar element of the analysis container 610 and will not be detailed herein for brevity except for differences with the analysis container 610.

The analysis container 710 may include a case 712, an outer tube 740, and inner tubes 750. The case 712 includes walls 713 and/or a lid 715 that are formed of a thermally conductive material. The walls 713 and/or the lid 715 of the case 712 may act as a heat shield for a gap 735 defined between the case 712 and the outer tube 740. The gap 735 may be filled with air or other material to insulate the outer surface of the outer tube 740 from the case 712. In some embodiments, the walls 713 and/or the lid 715 of the case 712 may be formed of aluminum, steel, stainless steel, or other thermally conductive material.

The outer tube 740 defines a buffer volume 741 in which the inner tubes 750 are received as detailed below. The walls 743 forming the outer tube 740 are formed of a material having a thermal conductivity close to that of a buffer material received within the buffer volume 741. Forming the walls 743 of a material having a thermal conductivity close to the buffer material may prevent or reduce radial freezing of the buffer material. In some embodiments, the buffer material may be water which has a thermal conductivity of 0.6 W/mK and the walls 743 of the outer tube 740 may be formed of a polymer. For example, the walls 743 may be formed of polyethylene terephthalate glycol (PETG) which has a thermal conductivity of 0.2 W/mK. The outer tube 740 may include a skeleton or tube holding frame 742 that receives and supports the inner tubes 750. The outer tube 740 may include a cap 746 that seals the top of the outer tube 740 and allows access to the buffer volume 741 and the inner tubes 750.

The tube holding frame 742 may define external saddles that each receive a respective one of the inner tubes 750 to secure the inner tubes 750 and prevent movement of the inner tubes 750 within the outer tube 750. The tube holding frame 742 may include an upper segment that engages each of the inner tubes 750 adjacent a top end of the inner tube 750 and a lower segment that engages each of the inner tubes 750 adjacent the bottom ends of the inner tube 750. The lower segment 744 may be shaped to match a bottom portion of each of the inner tubes 750. The tube holding frame 742 may have a central segment that extends between the upper segment and the lower segment and is spaced apart from the inner tubes 750 such that a buffer material within the buffer volume 741 surrounds the inner tubes 750. The lower segment 744 may include a passage 745 that extends therethrough. The passage 745 may allow the buffer material to flow therethrough and be in contact with the inner tubes 750. The materials of the outer tube 740 and/or the tube holding frame 742 may prevent or reduce radial heat transfer to the buffer material and/or the contents of the inner tubes 750. The outer tube 740 and/or the tube holding frame 742 may be formed of a polymer such as a thermoplastic or thermoset material. For example, the outer tube 740 and/or the tube holding frame 742 may be formed of PETG, polyethylene, or polycarbonate. The materials of the outer tube 740 and the tube holding frame 742 may be suitable for containing the inner tubes 750 and the buffer material in a temperature range of negative 80 degrees Celsius to 40 degrees Celsius.

Each of the inner tubes 750 defines a storage volume 734. The inner tubes 750 may be formed of a single continuous tube that is bent to have a first tube 752 and a second tube 756 that each define a storage volume 735 and are joined by a U-shaped connector 754. The U-shaped connector 754 may have a constant cross-section. In embodiments, a top open end of the first tube 752 or the second tube 756 is flared into a conical shape to act as a funnel. The funnel of the top open end may aid in the filling of the respective inner tube 750. The funnel of the top open end may aid in alignment of a pipette with the respective inner tube 750. In certain embodiments, alternating open ends of the inner tubes 750 are flared to allow for a more compact fitting in the tube holding frame 742. In particular embodiments, the flared open ends are flared using heat forging or other suitable process. In some embodiments, the inner tubes 750 may be a double lumen tube that includes a first tube 752 that defines a first lumen 753 and a second tube 756 that defines a second lumen 757 that are in fluid communication with one another via a connector 754. In certain embodiments, the inner tubes 750 are formed of a first tube 752 and a separate second tube 756 that are joined together by the connector 754.

The inner tubes 750 are sized and dimensioned such that the first lumen 753 and the second lumen 757 have a diameter in a range of 0.5 mm to 6 mm, e.g., 0.5 mm, 0.75 mm, 1 mm, 1.5 mm, 2 mm, 2.5 mm, 3 mm, 3.5 mm, 4 mm, 4.5 mm, 5 mm, 5.5 mm, or 6 mm, and a length up to 100 mm, e.g., 10 mm, 20 mm, 30 mm, 40 mm, 50 mm, 60 mm, 70 mm, 80 mm, 90 mm, or 100 mm. In some embodiments, the inner tubes 750 have a length greater than 100 mm. The storage volume 734 may be in a range of 10 µL to 100 µL, e.g., 10 µL, 20 µL, 30 µL, 40 µL, 50 µL, 60 µL, 70 µL, 80 µL, 90 µL, or 100 µL. In some embodiments, the storage volume 734 is greater than 100 µL. The walls of the inner tubes 750 may be optimized in thickness to prevent or reduce radial freezing of the contents of the inner tubes 750 while allowing thermal transfer into or out of the lumens 753, 757. In some embodiments, the inner tubes 750 may be formed of a polymeric material. In certain embodiments, the inner tubes 750 may be formed of a thermoplastic or thermoset material. For example, the inner tubes 750 may be formed of linear low density polyethylene (LLDPE) or ethylene vinyl acetate (EVA).

In some embodiments, components of the outer tube 740, the tube holding frame 746, and/or the inner tubes 750 may be monolithically formed with one another. For example, the entire outer tube 740 and the inner tubes 750 may be formed as a monolithic or unitary part via additive manufacturing techniques. In some embodiments, the outer tube 740 and the tube holding frame 746 are monolithically formed with one another with the inner tubes 750 selectively received in saddles of the tube holding frame 746.

The bottom 747 of the outer tube 740 may form a transfer surface that is configured to contact a primary TEC 12 to transfer thermal energy into or out of the outer tube 740. There may be a small gap between the bottom of the inner tubes 750, e.g., the connectors 754, and the bottom 747 of the outer tube 740. The small gap may be filled with the buffer material which conducts thermal energy between the connectors 754 and the primary TEC 12. The small gap does not affect the thermal transfer into or out of the inner tubes 750 as the inner tubes 750 are completely surrounded by the buffer material.

The walls 713 of the case 712 are in contact with a secondary TEC 13 such that thermal energy is transferred about the case 12 to act as a heat shield for the outer tube 740 from the ambient environment. In certain embodiments, the secondary TEC 13 and the walls 713 of the case 712 may be used to prevent radial freezing of the buffer material and/or the contents of the inner tubes 750 as detailed below. In some embodiments, the secondary TEC 13 may be used to freeze the buffer material and the contents of the inner tubes 750.

Figure 23:
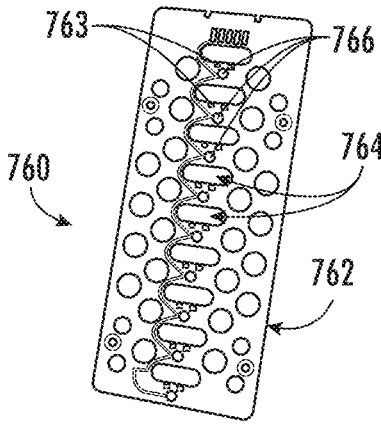
FIG. 23 is a back view of a sensor assembly of the analysis container of FIG. 21.
Figure 24:
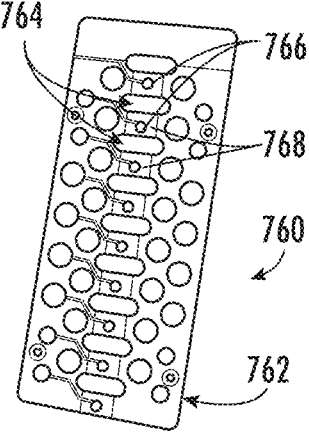
FIG. 24 is a front view of the sensor assembly of FIG. 23.

With additional reference to FIGS. 23 and 24, the analysis container 710 includes a sensor assembly 760 that is secured to the external surface of the outer tube 740. The sensor assembly 760 is configured to measure a temperature of the outer tube 740 at different vertical points along a vertical length of the outer tube 740. The sensor assembly 760 may be used to monitor the temperature of the buffer material which fills the cavity 741 of the outer tube 740. As the buffer material surrounds the inner tubes 750, the temperature of the buffer material is similar to the temperature of the contents of each of the inner tubes 750 at the corresponding vertical position. Thus, the arraignment of the outer tube 740 and the sensor assembly 760 may allow for a single sensor assembly 760 to provide a temperature for each of the contents of the inner tubes 750 without requiring a separate sensor for each inner tube 750. The sensors 766 may be equally spaced apart from one another. The sensor assembly 760 includes a printed circuit board (PCB) 762 that supports a plurality of sensors 766. The PCB 762 may define windows 764 between the adjacent sensors 766 to prevent thermal transfer along the PCB 762 between adjacent sensors 766. The sensor assembly 760 may include traces 763 on the back surface of the PCB 762, the surface away from the outer tube 740. The traces 763 may be indirect traces to prevent thermal conductivity between the sensors 766. The sensor assembly 760 may include a conductive cylinder 768 that extends from each sensor 766 and is in contact with the outer surface of the outer tube 740 to place each sensor 766 in thermal conductivity with the outer tube 740. The sensor assembly 740 may be secured to the bosses 748 of the outer tube 740. The sensors 766 may be a surface mounted temperature sensor with an I2C interface. In certain embodiments, the sensors 766 may be a thermocouple or a resistive type sensor such as a platinum RTD or thermistor The analysis container 710 may be part of a freezing system 700 as shown in FIGS. 18-20 which include the analysis container 710 and a freezing platform 702 including multiple freezing stations 704. Each freezing station 704 includes a primary TEC 12 and a secondary TEC 13 that are configured to contact portions of the analysis container 710 as detailed below.

The freezing stations 704 include a receiver 714 that receives the case 712 to position the case 712 on the freezing station 704. The receiver 714 may secure the case 712 to the freezing platform 702. For example, the receiver 714 may clamp to the case 712. The outer tube 740 is received in the case 712 with a gap 735 defined about the outer tube 740. The freezing system 700 may include insulation (not shown) disposed about all outer surfaces including the case 712, the receiver 714, and under the TECs 12, 13. When the case 712 is positioned on the freezing platform 702, the walls 713 of the case are in contact with the secondary TEC 13. When the outer tube 740 is received in the case 712, the bottom 747 of the outer tube 740 is in contact with the primary TEC 12.

The tube-in-tube design detailed above of the outer tube 740 and the inner tubes 750 has been developed to achieve axial freezing of contents of the inner tubes 750 and prevent radial freezing of the contents of the inner tubes 750. The first tube 752 and the second tube 756 of the inner tubes 750 may be sized and dimensioned to achieve axial freezing, along the longitudinal axis of the respective lumen, of a biopharmaceutical composition within the first and second lumens 753, 757 and prevent or reduce radial freezing, from the walls toward the center of the respective lumen. Counterintuitively, it has been found that the smaller the inner diameter of a tube, the more difficult it may be to achieve axial freezing along the entire length of the tube. This difficulty may be the result of a reduction of the cross-sectional area of the tube in view and the ambient heat load surrounding the tube. For example, it may be difficult for a small diameter tube to conduct heat axially to overcome the ambient heat load of the surroundings of the tube. In some experiments, it has been found that a tube having a diameter less than 6 mm to 10 mm may not be able to axially conduct heat to overcome an ambient heat load such that a portion of the fluid at the top of the tube may remain liquid. This observation has been observed even when the ambient heat load is minimized via insulation and/or environmental controls. In view of these difficulties, the tube-in-tube design detailed above of the outer tube 740 and the inner tubes 750 may allow for axial freezing of the entire contents of the outer tube 740 including the buffer material and the contents of the inner tubes 750 and prevent radial freezing of the buffer material and/or the contents of the inner tubes 750. For example, the outer tube 740 may be considered the diameter such that the contents of the outer tube 740 are frozen axially and transmit a heat load axially.

Figure 25:
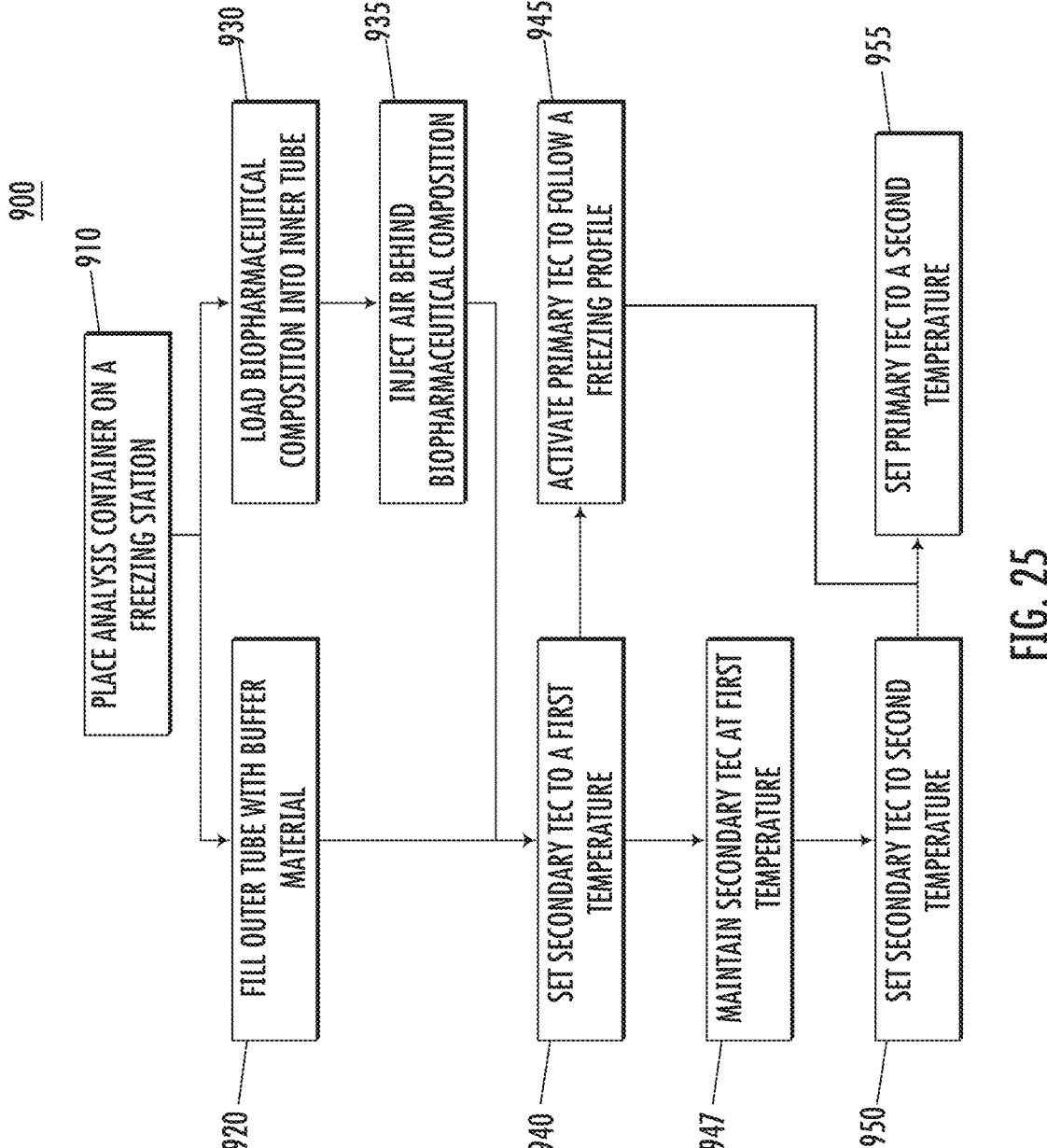
FIG. 25 is a flow chart of a method of freezing a biopharmaceutical composition in accordance with embodiments of the present disclosure.

Referring now to FIG. 25, a method of axially freezing a biopharmaceutical composition in a small diameter tube is disclosed in accordance with the present disclosure and is referred to generally as method 900 with reference to the analysis container 710 of FIGS. 18-24. The method 900 includes placing an analysis container 710 on a freezing station 704 (Step 910). Placing the analysis container 710 on the freezing station 704 may include placing the case 712 on the freezing platform 702 with the walls 713 of the case 712 in contact with the secondary TEC 13. In some embodiments, the case 712 is secured to the freezing station 704 for multiple freezing processes. The method may include inserting an outer tube 740 including a plurality of inner tubes 750 disposed within the outer tube 740. In certain embodiments, the method 900 includes inserting the plurality of inner tubes 750 into the outer tube 740. In particular embodiments, the method 900 includes securing the inner tubes 750 on a tube holding frame 742 of the outer tube 740. When the outer tube 740 is placed on the freezing station 704 the bottom of the outer tube 747 is in direct contact with the primary TEC 12. In some embodiments, the outer tube 740 may be provided as an assembled part with the inner tubes 750 secured to the tube holding frame 742 which is secured inside the outer tube 740 with the cap 746 installed on the top end of the outer tube 740. The assembled outer tube 740 may be provided as a sterilized part that is ready for use.

The method 900 includes filling the outer tube 740 with a buffer material (Step 920). The depth of the buffer material in the outer tube 740 may simulate a freezing path length to be modeled. For example, to model a large container, e.g., a 75 L container, the freezing path may be 84 mm to simulate the corresponding freeze path such that the buffer material may be filled to a point at which the inner tubes 750 are surrounded for a depth of 84 mm. In contrast, to model a small container, e.g., a 2 L container, the freezing path may be 20 mm. The outer tube 740 may be filled with a robot, e.g., robot 800, that inserts one or more pipettes or conduits through the cap 746 of the outer tube 740 to fill the buffer volume 741 of the outer tube 740. When a robot is used to fill the buffer material, the robot may calculate the depth of buffer material, and thus the freeze path length, based on a size of the container to be modeled. The buffer material may be water or other suitable liquid having a freezing point suitable for the freezing process. In some embodiments, the buffer material has a freezing temperature at or below zero degrees Celsius.

The method 900 includes loading the inner tubes 750 with a biopharmaceutical composition to be frozen (Step 930). Filling the inner tubes 750 may include inserting a pipette through the cap 746 such that the pipette is inserted into an open end of a respective inner tube 750 with the other end of the respective inner tube 750 being open to the air to allow air within the inner tube 750 to escape as the inner tube 750 is loaded. In some embodiments, the one end of each inner tube 750 is flared to form a funnel to receive the pipette. A robot, e.g., robot 800, may be used to fill the inner tubes 750. The inner tubes 750 may be filled sequentially or simultaneously with one another and/or the outer tube 740. Similar to the amount of buffer material, the amount of biopharmaceutical composition loaded into the inner tubes 750 may be determined to model the freeze path of a container to be modeled. Further, when filled with a robot, the robot may calculate the amount of biopharmaceutical composition based on the size of the container being modeled.

In some embodiments, a small amount of air may be injected into the end of each of the inner tubes 750 behind the biopharmaceutical composition is loaded (Step 935). Injecting the small amount of air may level the height in the first tube 752 and the second tube 756 of a U-shaped inner tube 750. Specifically, the air may overcome capillary forces that may prevent equalization between the height of fluid in the first tube 752 and the second tube 756 of a respective inner tube 750. In some embodiments, a biopharmaceutical composition may be loaded into an inner tube 750 by drawing the biopharmaceutical composition into one end from the other end of the respective inner tube 750.

With the loaded analysis container 710 placed on the freezing station 704, the secondary TEC 13 is set to a first temperature to act as a heat shield for the outer tube 740 (Step 940). The first temperature is near the freezing point of the buffer material. For example, the first temperature may be slightly above or below 0 degrees Celsius when the buffer material freezes at 0 degrees Celsius. For example, the first temperature may be in a range of negative 1 degree Celsius to 1 degree Celsius. The sensor assembly 760 may be used to monitor a temperature of the buffer material within the outer tube 740 during the freezing process. The sensor assembly 760 may provide indicia when all the sensors 766 are substantially equal in temperature or at a desired temperature, e.g., the first temperature or 1 degree Celsius.

With the secondary TEC 13 set to the first temperature, the primary TEC 12 is activated to follow a freezing profile to axially freeze the buffer material and the biopharmaceutical composition in the inner tubes 750 (Step 945). The freezing profile may be a time vs. temperature profile that simulates a freezing process of a container being modeled. The freezing profile concludes with a temperature sufficiently below freezing temperature of the biopharmaceutical composition such that the biopharmaceutical composition is axially frozen. The secondary TEC 13 may be maintained at the first temperature during the freezing of the biopharmaceutical composition (Step 947). Maintaining the secondary TEC 13 at the first temperature, may prevent radial freezing of the buffer material and the biopharmaceutical composition.

When the biopharmaceutical composition is frozen, the secondary TEC 13 is reduced to a second temperature to allow the biopharmaceutical composition to reach a target temperature (Step 950). The second temperature may be in a range of negative 80 degrees Celsius to negative 20 degrees Celsius or negative 60 degrees Celsius to negative 40 degrees Celsius. When the freezing profile is complete, the primary TEC 12 is reduced to the second temperature reduce the temperature of the biopharmaceutical composition to the target temperature (Step 955). The target temperature for the buffer material and the biopharmaceutical composition may be in a range of negative 80 degrees Celsius to negative 20 degrees Celsius, e.g., −80, −60, −40, −30, or −20 degrees Celsius.

The analysis container 710 may be used to simulate a thawing process in reverse manner to the freezing process detailed above. For example, the secondary TEC 13 may be set near a thawing temperature, e.g., in a range of negative 1 degree Celsius to 1 degree Celsius, to prevent radial thawing while the primary TEC 12 goes through a thawing profile to axially thaw the buffer material and the biopharmaceutical composition. Once the biopharmaceutical composition and the buffer material are thawed, the secondary TEC 13 and eventually the primary TEC 12 are set to another temperature after the biopharmaceutical composition and the buffer material are thawed. The other temperature may be a target temperature at or above 15 degrees Celsius. The other temperature may be in a range of 5 degrees Celsius to 30 degrees Celsius, e.g., 15 degrees Celsius.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. An analysis container comprising:
an outer tube defining a buffer volume configured to receive a buffer material; and
a plurality of inner tubes disposed within the buffer volume, each inner tube having an inner diameter equal to or less than 6 mm, each inner tube configured to receive a biopharmaceutical composition therein, the outer tube configured such that the buffer material and the biopharmaceutical composition are axially frozen.

2. The analysis container according to claim 1, further comprising a tube holding frame disposed within the buffer volume of the outer tube, each inner tube secured to the tube holding frame.

3. The analysis container according to claim 2, wherein the tube holding frame is monolithically formed with the outer tube.

4. The analysis container according to claim 3, wherein the inner tubes are monolithically formed with the outer tube and the tube holding frame.

5. The analysis container according to claim 1, wherein each inner tube includes a first tube, a second tube, and a connector fluidly coupling the first tube and the second tube, the connector being U-shaped such that an open end of the first tube and an open end of the second tube are adjacent one another.

6. The analysis container according to claim 1, wherein each inner tube has a diameter of 1 mm.

7. The analysis container according to claim 6, wherein each inner tube has a vertical length of 100 mm.

8. The analysis container according to claim 1, further comprising a case, the outer tube disposed within the case, the case including walls formed of a heat conductive material, the walls of the case configured to contact a thermal electric cooler such that the walls are maintained above a freezing temperature of the buffer material while the buffer material is axially frozen.

9. The analysis container according to claim 1, further comprising a sensor assembly secured to a wall of the outer tube, the sensor assembly including a plurality of sensors vertically spaced apart from one another, each sensor in thermal contact with a point on the wall of the outer tube and configured to determine a temperature of the buffer material disposed within the outer tube.

10. The analysis container according to claim 1, wherein each tube of the plurality of inner tubes defines central longitudinal axis, the buffer material and the biopharmaceutical composition are axially frozen in a direction extending along the central longitudinal axis.

11. A method of axially freezing a biopharmaceutical composition, the method comprising:

activating a primary thermal electric cooler (TEC) to axially freeze contents of an outer tube including a buffer material and a biopharmaceutical composition disposed in a plurality of inner tubes disposed within each inner tube, the plurality of inner tubes disposed within the outer tube;
set a secondary TEC at a first temperature near a freezing point of the buffer material before activating the primary TEC, the secondary TEC in thermal contact with walls of a case, the outer tube disposed within the case; and
maintaining the secondary TEC at the first temperature until the buffer material and the biopharmaceutical composition are frozen.

12. The method according to claim 11, further comprising reducing the secondary TEC to a second temperature below the freezing point of the buffer material after the buffer material and the biopharmaceutical composition are frozen.

13. The method according to claim 12, wherein the second temperature is in a range of −80 degrees Celsius to −20 degrees Celsius.

14. The method according to claim 11, further comprising monitoring a temperature of the biopharmaceutical composition with a sensor assembly in contact with an outer surface of the outer tube.

15. The method according to claim 11, further comprising placing the case on a freezing station such that walls of the case are in thermal contact with the secondary TEC and a bottom of the outer tube in thermal contact with the primary TEC.

16. The method according to claim 11, further comprising loading the biopharmaceutical composition into each inner tube before activating the secondary TEC.

17. The method according to claim 16, wherein loading the biopharmaceutical composition includes injecting air behind the biopharmaceutical composition to level the biopharmaceutical composition in two vertical tubes of each inner tube.

18. The method according to claim 11, wherein activating the primary TEC includes:
following a freezing profile with the primary TEC to axially freeze the buffer material and the biopharmaceutical composition; and
setting the primary TEC to a second temperature below the freezing point of the buffer material.

19. The method according to claim 11, further comprising thawing the biopharmaceutical composition comprising:
setting the secondary TEC to a third temperature near the thawing point of the buffer material;
activating the primary TEC to axially thaw contents of the outer tube including the buffer material and the biopharmaceutical composition after setting the secondary TEC to the third temperature; and
maintaining the secondary TEC at the third temperature until the buffer material and the biopharmaceutical composition are thawed.

20. The method according to claim 19, further comprising setting the secondary TEC to a fourth temperature above a thawing temperature of the biopharmaceutical composition after the biopharmaceutical composition is thawed.

21. The method according to claim 19, wherein activating the primary TEC to axially thaw the contents of the outer tube includes controlling the primary TEC through a thawing profile to simulate a thawing of a modeled container.

* * * * *